US012701512B2

(12) United States Patent
Ryu et al.

(10) Patent No.: US 12,701,512 B2
(45) Date of Patent: Aug. 4, 2026

(54) LOW-POWER WAKE-UP SIGNAL (LP-WUS) PROCEDURES

(71) Applicant: QUALCOMM Incorporated, San Diego, CA (US)

(72) Inventors: Jung Ho Ryu, Fort Lee, NJ (US); Kazuki Takeda, Tokyo (JP); Igor Gutman, Hod HaSharon (IL); Hemant Saggar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 18/619,089

(22) Filed: Mar. 27, 2024

(65) Prior Publication Data

US 2025/0310880 A1     Oct. 2, 2025

(51) Int. Cl.
| | |
|---|---|
| *H04W 52/02* | (2009.01) |
| *H04L 27/02* | (2006.01) |
| *H04W 56/00* | (2009.01) |

(52) U.S. Cl.
CPC ......... *H04W 52/0235* (2013.01); *H04L 27/02* (2013.01); *H04W 56/0015* (2013.01)

(58) Field of Classification Search
CPC .......... H04W 52/0235; H04W 56/0015; H04L 27/02
See application file for complete search history.

(56) References Cited

U.S. PATENT DOCUMENTS

| | | | |
|---|---|---|---|
| 2024/0098642 A1 | 3/2024 | Elshafie et al. | |
| 2024/0114453 A1* | 4/2024 | Xu .................... | H04W 52/0235 |
| 2024/0129854 A1* | 4/2024 | Elshafie ............ | H04W 52/0229 |
| 2024/0155491 A1* | 5/2024 | Cheng ............... | H04W 52/0229 |
| 2024/0260128 A1* | 8/2024 | Khoshkholgh Dashtaki ............... H04B 7/0626 |
| 2024/0276364 A1* | 8/2024 | Elshafie ............ | H04W 52/0206 |
| 2025/0088966 A1* | 3/2025 | Elshafie ............ | H04W 52/0235 |
| 2026/0052474 A1* | 2/2026 | Li ..................... | H04W 52/0235 |

FOREIGN PATENT DOCUMENTS

| | | | |
|---|---|---|---|
| CN | 117136593 A | 11/2023 | |
| CN | 118524492 A | * 8/2024 | .......... H04W 56/001 |
| CN | 120456188 A | * 8/2025 | |
| EP | 4529282 A1 | * 3/2025 | ........ H04W 52/0235 |

(Continued)

OTHER PUBLICATIONS

WO2024245302 Translation (Year: 2024).*

(Continued)

*Primary Examiner* — Kenny S Lin

(74) *Attorney, Agent, or Firm* — ArentFox Schiff, LLP

(57) ABSTRACT

Aspects of the disclosure are directed to methods and apparatus for time and frequency synchronization during a low-power wake up signal (LP-WUS) procedure. For example, an LP-WUS procedure may include transmission of signaling modulated via on-off keying (OOK). Such a signal requires less processing relative to an orthogonal frequency division multiplexing (OFDM) modulated signal and can be used to notify a wireless node that the transmitting device has data to transmit to the wireless node via an OFDM transmission. Accordingly, in response to the LP-WUS signal, the wireless node may power-on a main radio capable of receiving and demodulating the OFDM transmission.

19 Claims, 16 Drawing Sheets

(56)             References Cited

FOREIGN PATENT DOCUMENTS

WO     WO-2024234188 A1 * 11/2024   ............ H04L 27/26
WO     WO-2024245302 A1 * 12/2024   ............ H04W 72/11
WO     WO-2025160777 A1 *  8/2025   ............ H04W 52/02

OTHER PUBLICATIONS

International Search Report and Written Opinion—PCT/US2025/018277—ISA/EPO—Sep. 30, 2025.
OPPO: "Signal Design for LP-WUS and LP-SS", 3GPP TSG RAN WG1 #116, R1-2400590, 3rd Generation Partnership Project (3GPP), Mobile Competence Centre, 650, Route Des Lucioles, F-06921 Sophia-Antipolis Cedex, France, vol. RAN WG1, No. Athens, GR, Feb. 26, 2024-Mar. 1, 2024, Feb. 19, 2024, 11 Pages, XP052568372, Pro: 4, 11, 13, paragraph [02.1]—paragraph [02.3].
Partial International Search Report—PCT/US2025/018277—ISA/EPO—Jul. 15, 2025.

* cited by examiner

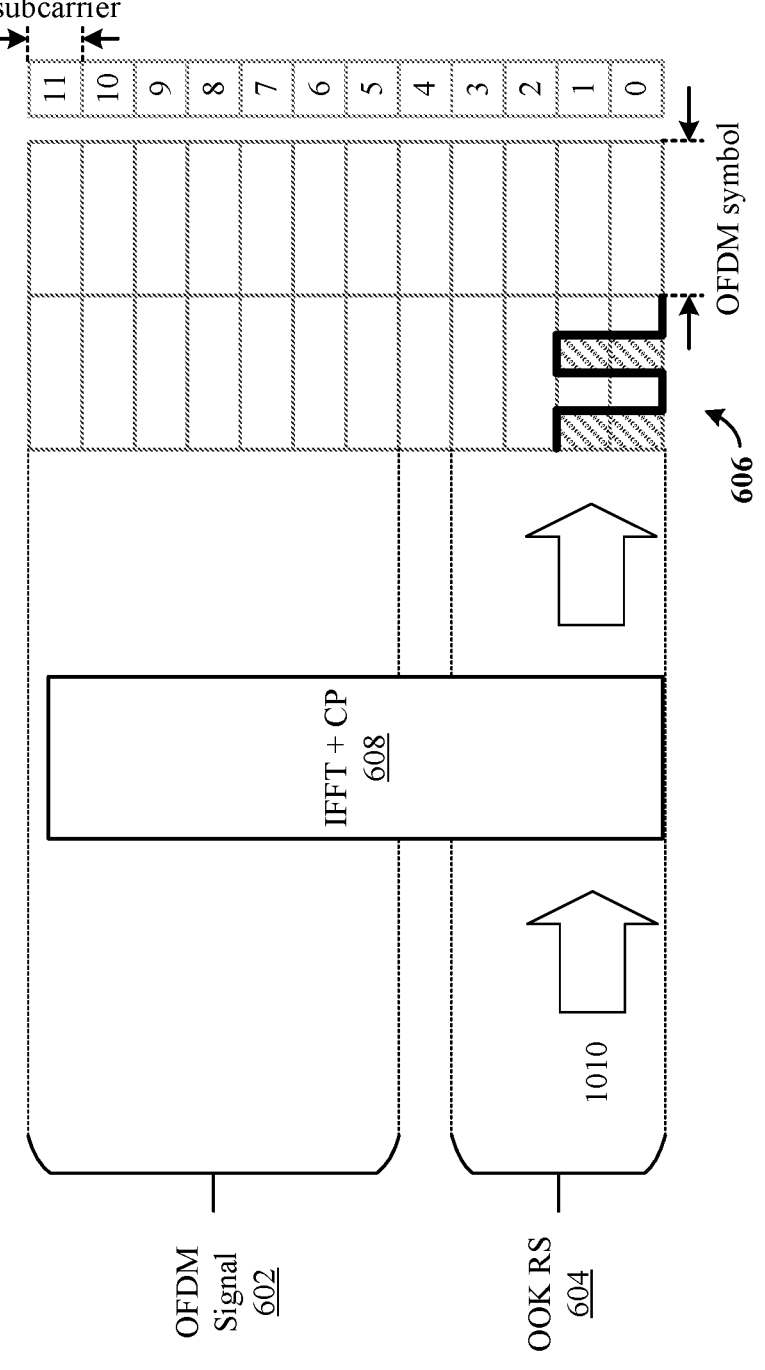
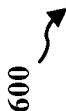
FIG. 6

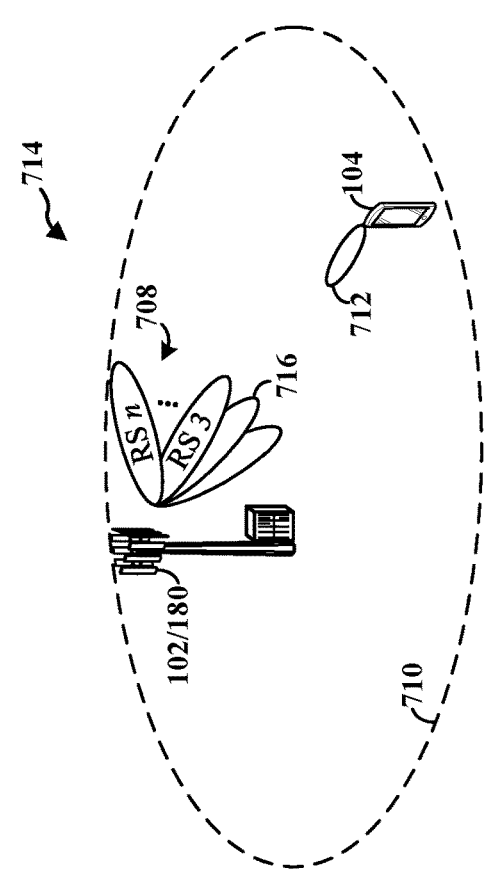
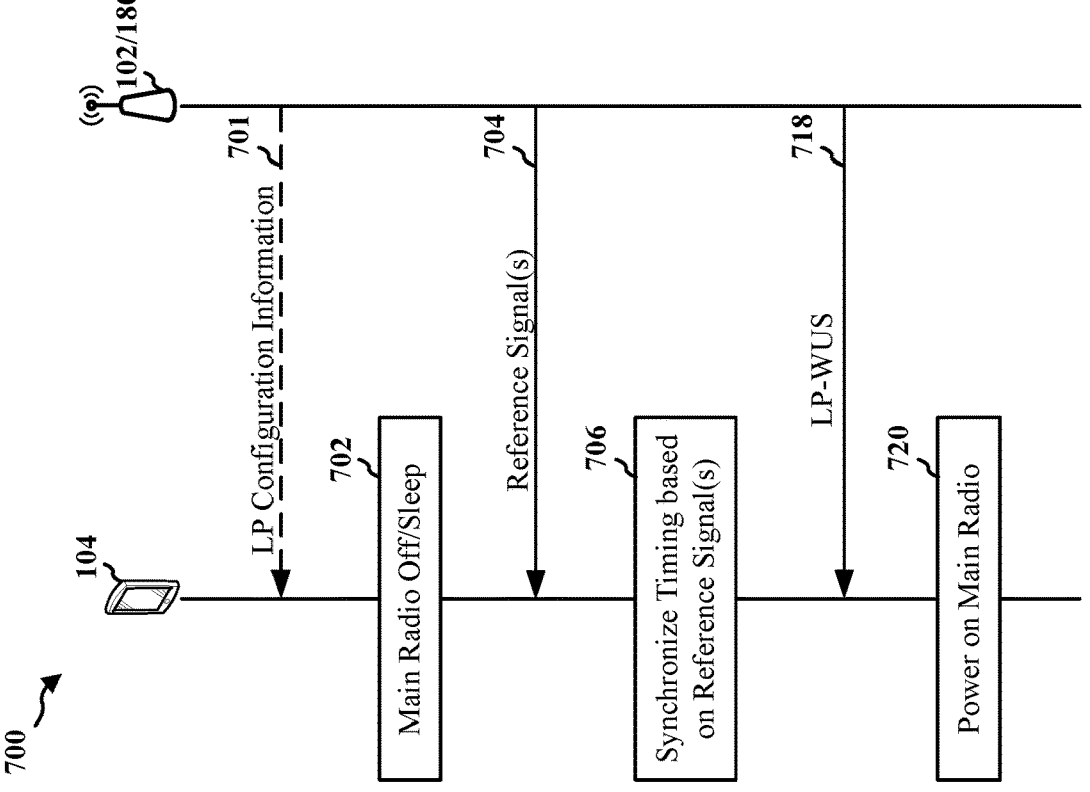
FIG. 7

800

104

102/180

- - - - LP Configuration Information - - - - 802

Main Radio Off/Sleep 804

LP-WUS 806

Power on Main Radio 808

Reference Signal 810

Synchronize based on Reference Signal 812

Downlink Transmission 814

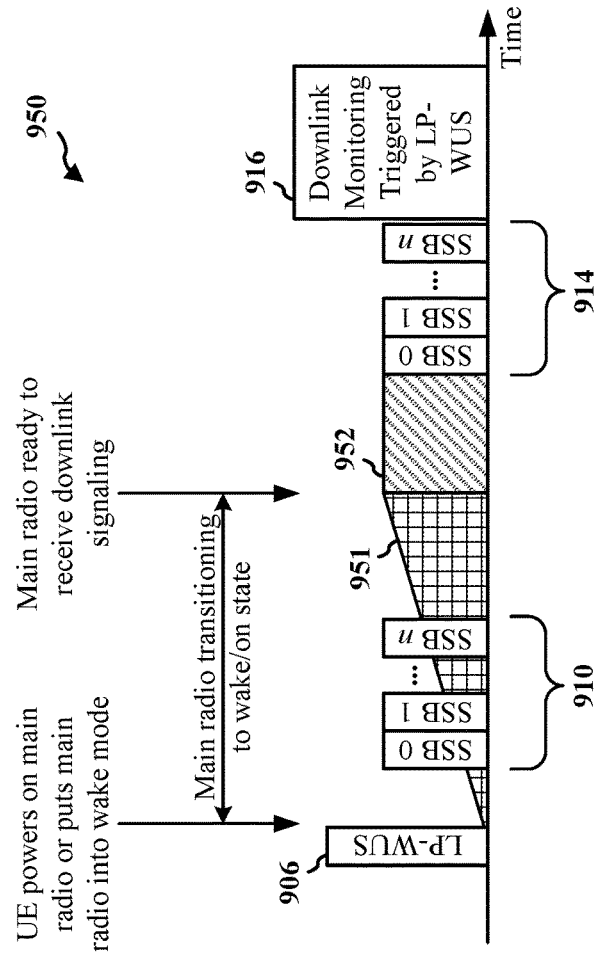
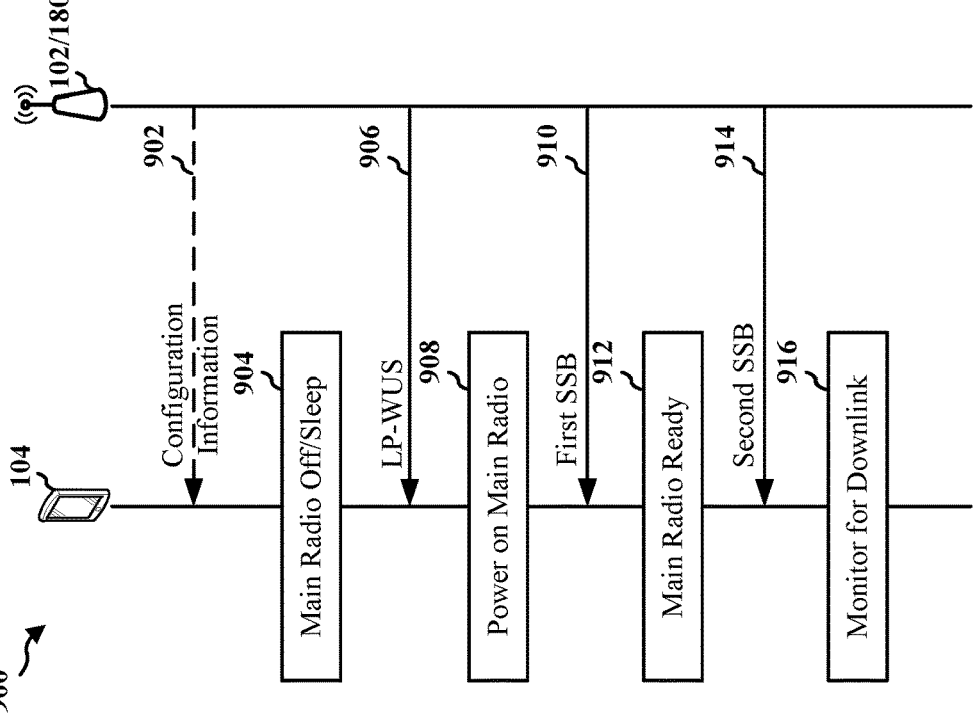
FIG. 9

1100

1102 receive, from the network entity via the second radio, an indication of at least one of a time resource or a frequency resource for receiving the periodic reference signal

1104 receive, via the first radio and prior to the LP-WUS being received, a periodic reference signal

1106 synchronize, prior to the LP-WUS being received, a timing of the second radio with a timing of a network entity based on the periodic reference signal

1108 receive, via the first radio and prior to the LP-WUS being received, a signal amplitude indicative of a synchronization signal block (SSB)

1110 synchronize, prior to the LP-WUS being received, a timing of the UE with a timing of a network entity based on a time the signal amplitude was received

1112 receive, via the first radio, a low-power wake-up signal (LP-WUS) indicating a downlink communication

1116 monitor, via the second radio, a downlink channel for the downlink communication after at least one of the dedicated reference signal or the periodic reference signal is received

1118 receive the downlink communication via the second radio after the LP-WUS is received

1202 cycle power to the second radio at one or more intervals consistent with a periodicity associated with reception of a reference signal

1204 receive, from a network entity and via the second radio, the reference signal according to the periodicity, wherein the reference signal is configured to provide a basis for the UE to: (i) synchronize a frequency of the second radio with a frequency of the downlink communication, prior to receiving the downlink communication, or (ii) synchronize a timing and the frequency of the second radio with a timing and the frequency of the downlink communication, prior to receiving the downlink communication

1302 power on the second radio or put the second radio into a wake state after receiving the LP-WUS

1304 receive, via the second radio prior to the downlink communication being received, at least one of a dedicated reference signal or a periodic reference signal, wherein the dedicated reference signal and the periodic reference signal are configured to provide a basis for the UE to: (i) synchronize a frequency of the second radio with a frequency of the downlink communication, prior to receiving the downlink communication, or (ii) synchronize a timing and the frequency of the second radio with a timing and the frequency of the downlink communication, prior to receiving the downlink communication

FIG. 13

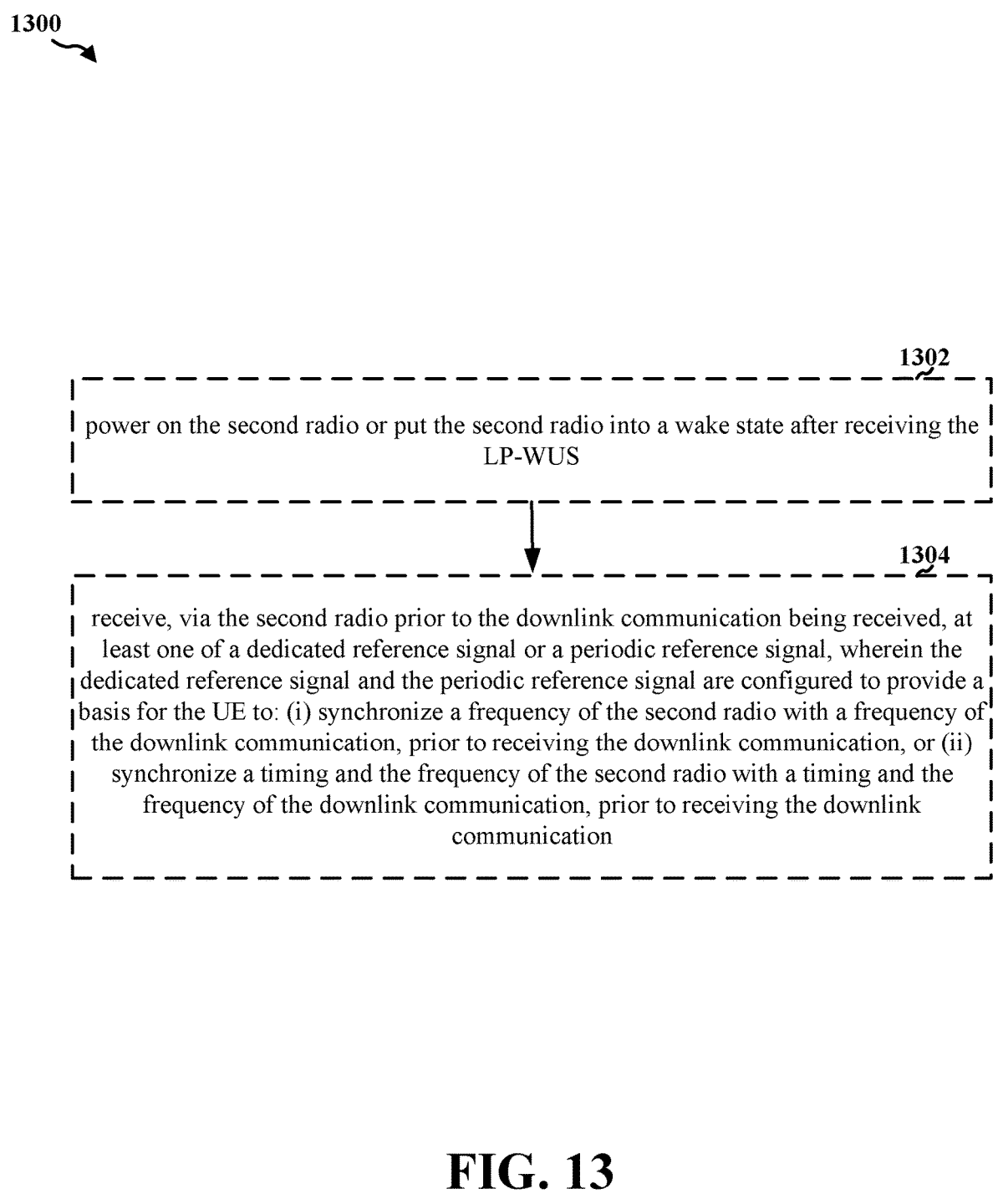

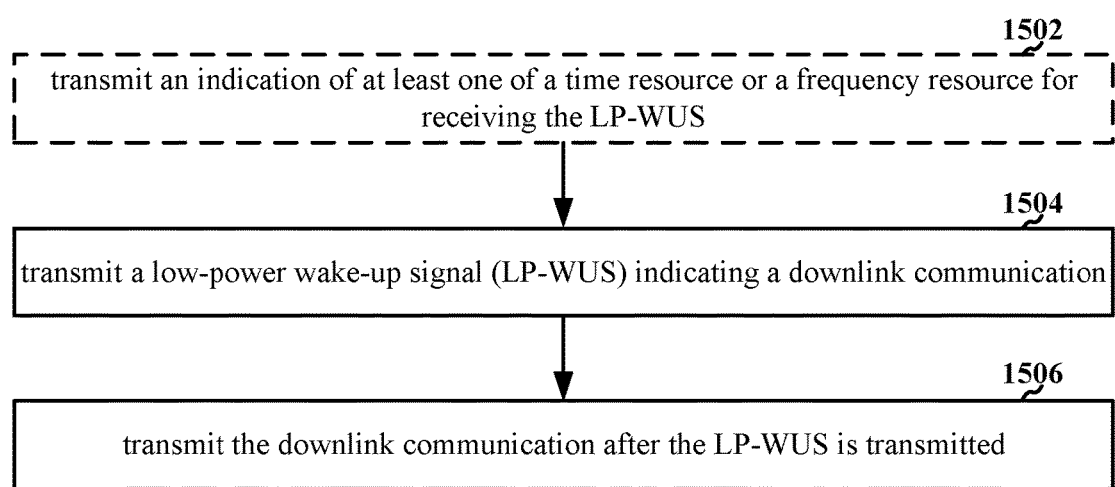
FIG. 15

LOW-POWER WAKE-UP SIGNAL (LP-WUS) PROCEDURES

BACKGROUND

Technical Field

The present disclosure generally relates to communication systems, and more particularly, to time and/or frequency synchronization between wireless nodes during low-power wake-up signal (LP-WUS) procedures.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Aspects are directed to a user equipment (UE) configured for wireless communication. In some examples, the UE includes a first radio and a second radio, the operation of which consumes more power than the first radio. In some examples, the UE includes one or more memories, individually or in combination, having instructions and one or more processors, individually or in combination, configured to execute the instructions. In some examples, the one or more processors are configured to receive, via the first radio, a low-power wake-up signal (LP-WUS) indicating a downlink communication. In some examples, the one or more processors are configured to receive the downlink communication via the second radio after the LP-WUS is received.

Aspects are directed to a network entity configured for wireless communication. In some examples, the network entity includes one or more memories, individually or in combination, having instructions and one or more processors, individually or in combination, configured to execute the instructions. In some examples, the one or more processors are configured to transmit, a low-power wake-up signal (LP-WUS) indicating a downlink communication. In some examples, the one or more processors are configured to transmit the downlink communication after the LP-WUS is transmitted.

Aspects are directed to a method for wireless communication at a wireless node. In some examples, the method includes receiving, via a first radio, a low-power wake-up signal (LP-WUS) indicating a downlink communication. In some examples, the method includes receiving the downlink communication via a second radio after the LP-WUS is received.

Aspects are directed to a method for wireless communication at a wireless node. In some examples, the method includes transmitting, a low-power wake-up signal (LP-WUS) indicating a downlink communication. In some examples, the method includes transmitting the downlink communication after the LP-WUS is transmitted.

Aspects are directed to an apparatus for wireless communication. In some examples, the apparatus includes means for receiving, via a first radio, a low-power wake-up signal (LP-WUS) indicating a downlink communication. In some examples, the apparatus includes means for receiving the downlink communication via a second radio after the LP-WUS is received.

Aspects are directed to an apparatus for wireless communication. In some examples, the apparatus includes means for transmitting, a low-power wake-up signal (LP-WUS) indicating a downlink communication. In some examples, the apparatus includes means for transmitting the downlink communication after the LP-WUS is transmitted.

Aspects are directed to a non-transitory computer-readable medium comprising instructions that, when executed by a wireless node, cause the wireless node to perform a method. In some examples, the method includes receiving, via a first radio, a low-power wake-up signal (LP-WUS) indicating a downlink communication. In some examples, the method includes receiving the downlink communication via a second radio after the LP-WUS is received.

Aspects are directed to a non-transitory computer-readable medium comprising instructions that, when executed by a wireless node, cause the wireless node to perform a method. In some examples, the method includes transmitting, a low-power wake-up signal (LP-WUS) indicating a downlink communication. In some examples, the method includes transmitting the downlink communication after the LP-WUS is transmitted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating an example OOK-RS generated using an OOK-4 waveform within a frame structure.

FIG. 7 is a composite figure that includes a call-flow diagram illustrating example communications between a UE and a network entity or base station, and an example network that includes the UE and the base station.

FIG. 9 is a composite figure that includes a call-flow diagram illustrating example communications between a UE and a network entity or base station, and an example timing diagram illustrating aspects of the example communications.

FIG. 11 is a flowchart of a method of wireless communication.

FIG. 12 is another flowchart of a method of wireless communication that illustrates aspects that may be used in combination with one or more aspects of FIGS. 11 and 13.

FIG. 13 is another flowchart of a method of wireless communication that illustrates aspects that may be used in combination with one or more aspects of FIGS. 11 and 12.

FIG. 15 is a flowchart of a method of wireless communication.

DETAILED DESCRIPTION

Figure 1:
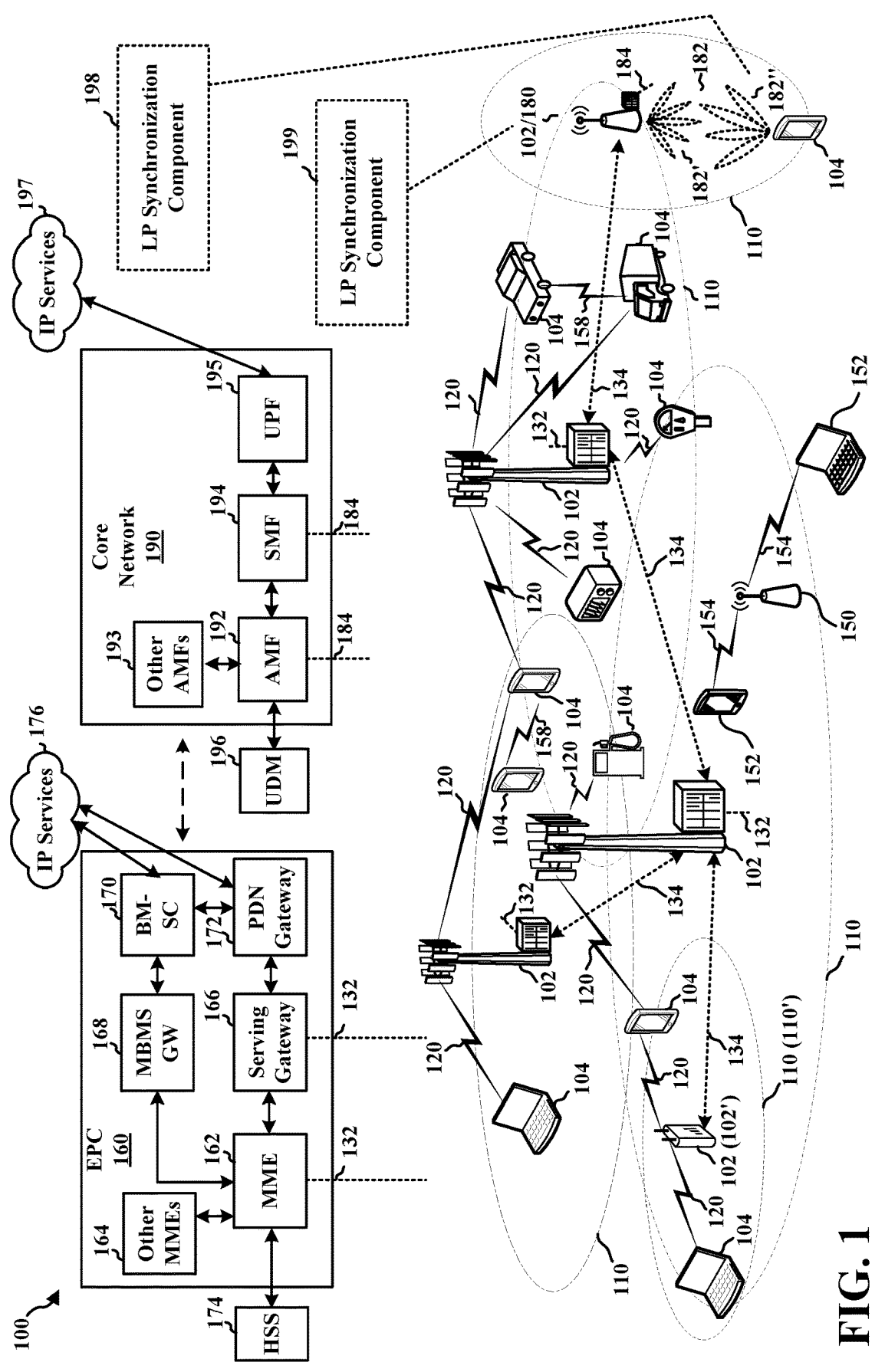
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In certain aspects of wireless communication, low-power wake-up signals (LP-WUSs) and low-power synchronization signals (LP-SSs) may be used to communicate or indicate certain information between wireless nodes. With LP-WUS and LP-SS procedures, a user equipment (UE) can be put into sleep mode to save power. In some examples, the UE may save significantly more power with LP-WUS and LP-SS procedures than with a discontinuous reception (DRX) procedure.

For example, when a UE is performing a DRX procedure, the UE may monitor for downlink transmissions from the network during an active time of each DRX cycle, and refrain from monitoring the downlink transmissions during an inactive time of each DRX cycle. Because the UE does not expect to receive a downlink transmission from the network during DRX inactive time, the UE can save power that would otherwise be consumed by signal monitoring by going into a sleep mode or low-power mode during DRX inactive time.

However, the UE's receiver still uses power even in a sleep or low-power mode because the UE needs to periodically receive synchronization signals from the network to maintain time and frequency synchronization with the network. Switching the UE's receiver on and off to maintain time and frequency synchronization consumes significant power, so in some examples, the UE's receiver may remain on even during sleep. Thus, power savings of the DRX procedure is primarily the result of not monitoring for downlink transmissions during inactive times.

Thus, to save even more power, aspects of the disclosure are directed to a UE configured to use a low-power wake-up receiver (LP-WUR) in addition to the current receiver (e.g., main radio) the UE uses to receive OFDM transmissions (e.g., physical downlink control channel (PDCCH) and/or physical downlink shared channel (PDSCH)). The LP-WUR may be configured to be switched on and off quickly relative to the main radio, and may be capable of receiving and processing relatively simple signals transmitted via a limited bandwidth (e.g., signal modulated using on-off keying (OOK)).

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A wireless node may comprise a UE, a base station, or a network entity.

Referring again to FIG. 1, the UE 104 may include a low power (LP) synchronization component 198. As described in more detail elsewhere herein, the LP synchronization component 198 may be configured to receive, via the first radio, a low-power wake-up signal (LP-WUS) indicating a downlink communication; and receive the downlink communication via the second radio after the LP-WUS is received. Additionally, or alternatively, the LP synchronization component 198 may perform one or more other operations described herein.

The base station 102/180 may include an LP synchronization component 199. As described in more detail elsewhere herein, the LP synchronization component 199 may be configured to transmit, a low-power wake-up signal (LP-WUS) indicating a downlink communication; and transmit the downlink communication after the LP-WUS is transmitted. Additionally, or alternatively, the LP synchronization component 199 may perform one or more other operations described herein.

Figures 2A, 2B, 2C, 2D:
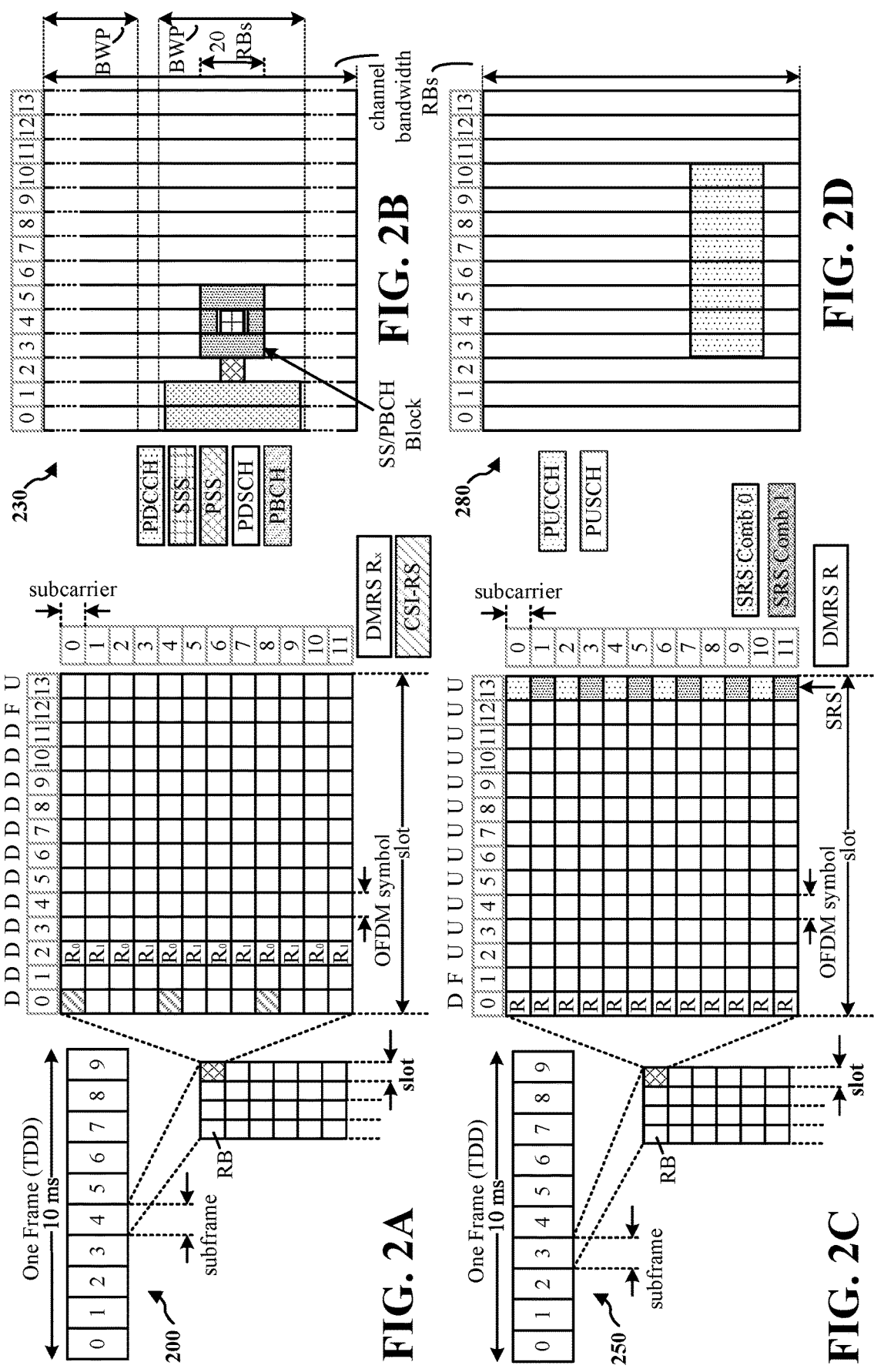
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 24 slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). The reference (pilot) signal may include a signal that is not intended to carry payload data (although aspects of the disclosure relate to a reference signal that may carry a small number of control bits thereon) from the core network to a UE, but is intended to refer to any signal that functions to improve UE function by informing the UE of some parameters that may be applicable to operation in a cell or access network (e.g., control information) and/or by providing a mechanism via which the UE is can acquire timing, synchronization, and other network properties.

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages. In some examples, a base station 102 may periodically transmit an SSB (e.g., SSB transmitted with period of 160 ms or less). A base station 102 may transmit an SSB on each beam of a plurality of directional beams in what is called an SSB burst. SSB bursts may also be transmitted periodically with a period of 160 ms or less.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
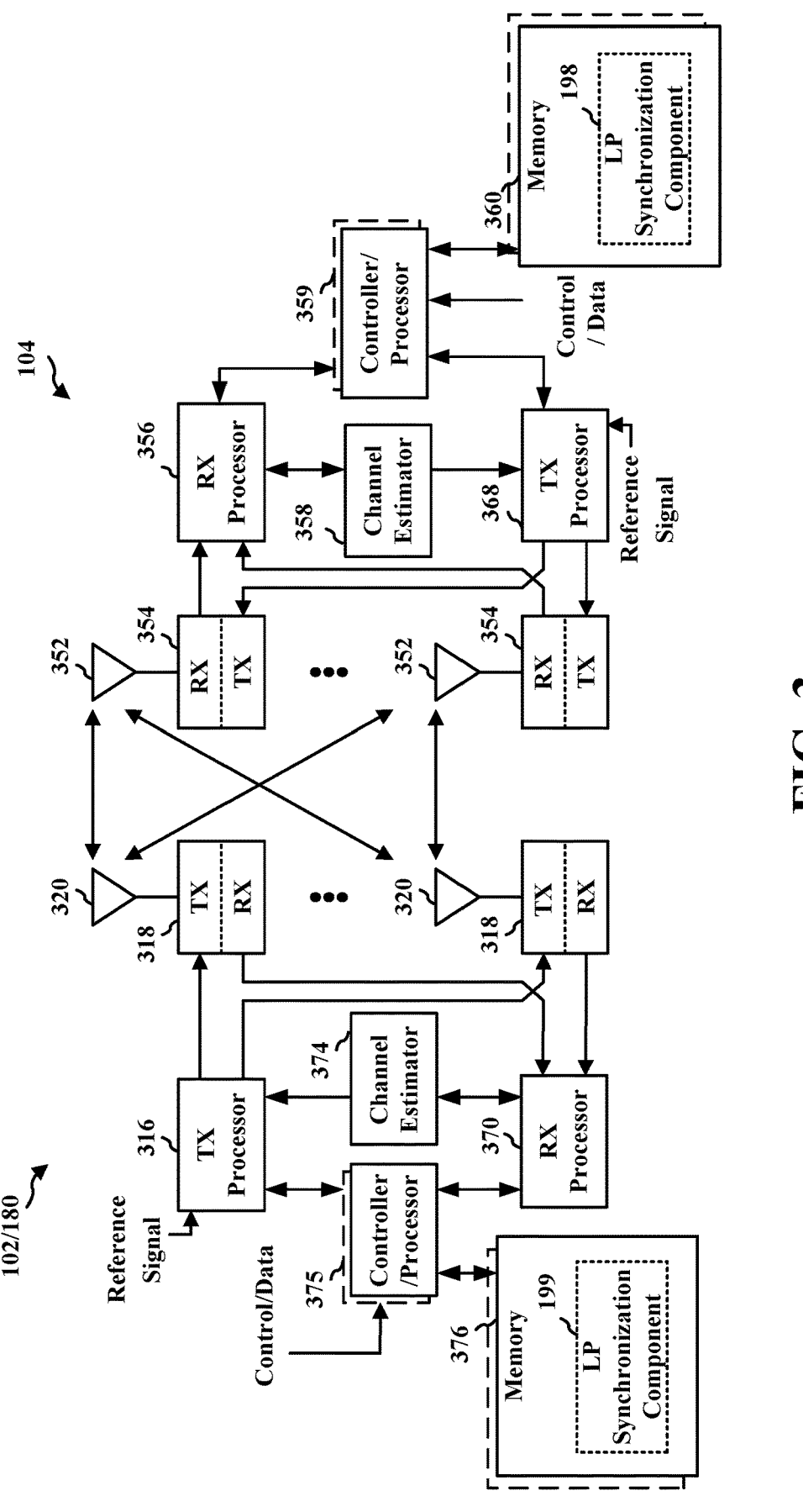
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to one or more controller/processors 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium and may be any of the types of computer-readable mediums discussed herein (e.g., RAM, ROM, EEPROM, optical disk storage, magnetic disk storage, other magnetic storage devices, combinations of the aforementioned types of computer-readable media, or any other medium that can be used to store computer executable code in the form of instructions or data structures that can be accessed by a computer). In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium and may be any of the types of computer-readable mediums discussed herein (e.g., RAM, ROM, EEPROM, optical disk storage, magnetic disk storage, other magnetic storage devices, combinations of the aforementioned types of computer-readable media, or any other medium that can be used to store computer executable code in the form of instructions or data structures that can be accessed by a computer). In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440. As used herein, a network entity may correspond to a base station or to a disaggregated aspect (e.g., CU/DU/RU, etc.) of the base station.

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium.

Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include one or more receivers, one or more transmitters or transceiver(s) (such as one or more radio frequency (RF) transceivers), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Examples of On-Off Keying (OOK) Communications

In certain aspects, a UE 104 may be configured with at least two different radios: a low-power wake-up radio (LP-WUR) implemented as an on-off keying (OOK) radio, and an OFDM radio (e.g., main radio). The OOK radio may be configured to transmit and/or receive wireless signaling that uses an OOK waveform. In some examples, a network entity 102 may transmit an OOK reference signal (OOK-RS) to the UE 104 to enable the UE 104 to synchronize time and/or frequency with the network entity.

In one example, the network entity 102 may periodically transmit an OOK-RS that the UE 104 may receive and use to synch the timing of one of more of the OOK radio and/or the main radio with the timing of the network entity 102, as described in more detail below. In some examples, the network entity 102 may transmit multiple OOK-RSs via multiple beams in a short period of time, similar to a transmission of an SSB burst. In some examples, an OOK-RS that is configured to provide the UE 104 with a means of time synchronization may be referred to as a low-power synchronization signal (LP-SS). The network entity 102 may provide the UE 104 with an indication of the time and frequency resources used by the network entity 102 to transmit the LP-SS.

In another example, the network entity 102 may transmit a low-power wake up signal (LP-WUS) using an OOK waveform to the UE 104 to trigger the UE 104 to power-on or wake its main radio to receive additional signaling (e.g., PDCCH/PDSCH). In some examples, the UE 104 may use the LP-WUS to synchronize the timing of one or more radios with the network entity 102.

Figure 5:
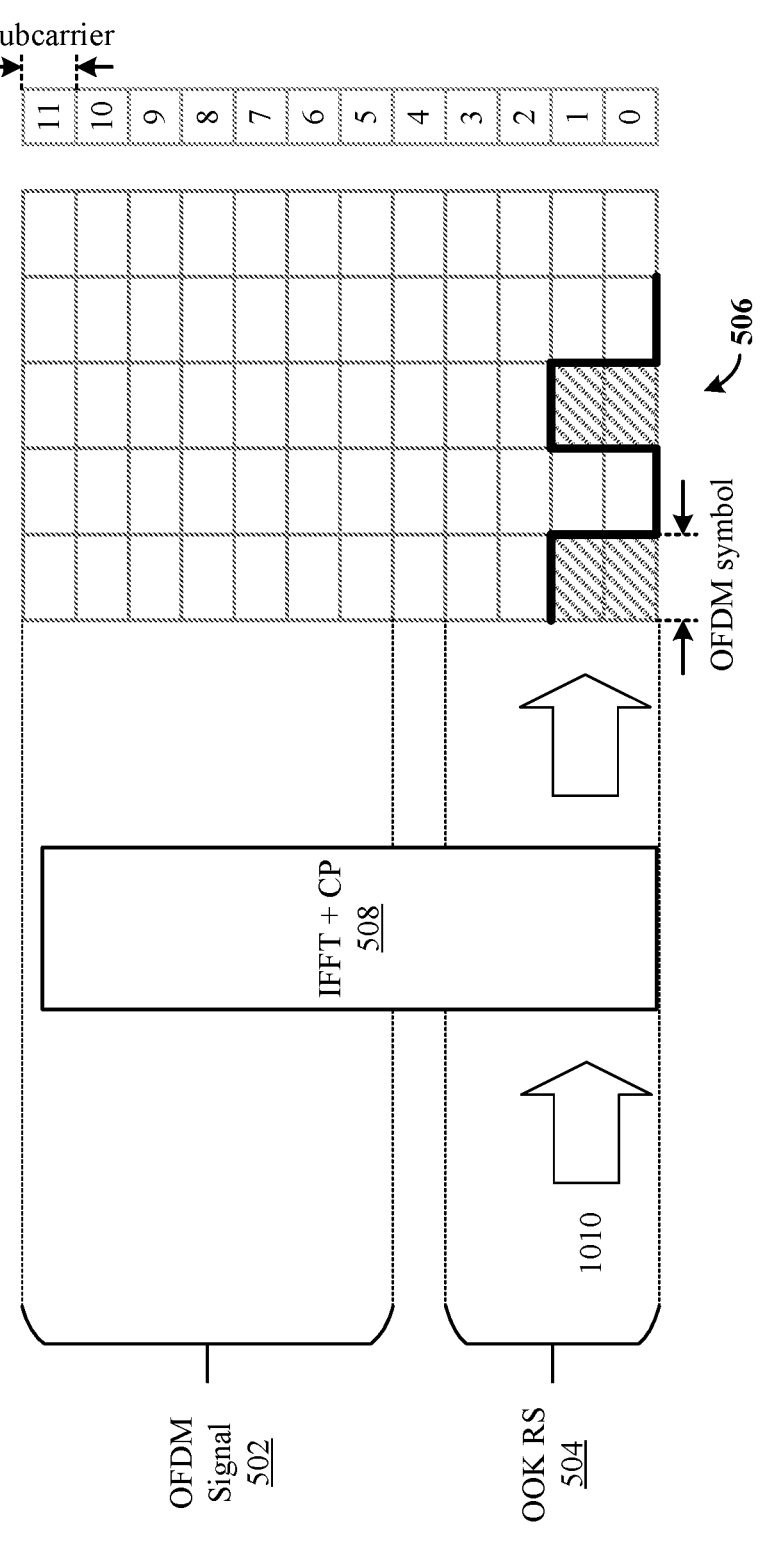
FIG. 5 is a diagram illustrating an example on-off keying reference signal (OOK-RS) generated using an OOK-1 waveform within a frame structure.

FIG. 5 is a diagram illustrating an example OOK-RS generated using an OOK-1 waveform 500 within a 5G NR frame structure. Data modulated using the "OOK-1" waveform is represented by the presence or absence of a carrier wave or subcarrier. In this form of modulation, binary data may be represented by one of two states: 1 or 0. For a '1' bit, a signal is present (ON), whereas for a '0' bit, the signal is absent (OFF). In some examples, for a '1' bit, all subcarriers associated with the OOK-RS are modulated. The '1' in OOK-1 indicates that one bit of information is transmitted per symbol.

In the illustrated example, an OOK-RS 504 may be generated based on binary data (e.g., 1010). Each bit of the binary data may be mapped to a corresponding OFDM symbol and passed through an IFFT block 508 configured to compute an inverse of a fast Fourier transform (IFFT) and cyclic prefix (CP). The IFFT block 508 transforms the binary bit and associated symbol from the frequency domain to the time domain and adds a CP to each symbol. The resulting OOK-RS 506 is then sent to an RF front-end where it may be upconverted to the carrier frequency and transmitted over the air.

Subcarriers 0-3 may be allocated for transmission of OOK-RS; however, the OOK-RS 506 may be transmitted via fewer subcarriers (e.g., subcarriers 0 and 1). The remaining subcarriers may be used for OFDM signaling 502 (e.g., subcarriers 5-11) and/or guard band (e.g., subcarrier 4).

FIG. 6 is a diagram illustrating an example OOK-RS generated using an OOK-4 waveform 600 within a 5G NR frame structure. Data modulated using the "OOK-4" waveform may also be represented by the presence or absence of a carrier wave or subcarrier, and the '4' in OOK-4 indicates that four bits of information may be transmitted per symbol.

In the illustrated example, an OOK-RS 604 is generated based on binary data 1010. Here, up to 4 bits of binary data may be mapped to a corresponding OFDM symbol. Thus, OOK-4 modulation may require a more complex modulation process relative to OOK-1. In some examples, prior to an IFFT block 608, N samples may be generated from M bits of binary data, where N is equal to the number of subcarriers allocated for OOK-RS and M is equal to the number binary data bits. As illustrated, N=2 and M=4. The resulting OOK-RS 606 is then sent to an RF front-end where it may be upconverted to the carrier frequency and transmitted over the air. As with the OOK-1 of FIG. 5, the OOK-RS 606 may be transmitted via fewer subcarriers (e.g., subcarriers 0 and 1) while the remaining subcarriers may be used for OFDM signaling 602 (e.g., subcarriers 5-11) and/or guard band (e.g., subcarrier 4).

Examples of Time and Frequency Synchronization

Frequency synchronization is a process in wireless communications where a receiver (e.g., the UE 104) adjusts its local oscillator to match the frequency of a signal from a transmitter (e.g., network entity 102). Such frequency synchronization processes are typically configured to ensure that the UE 104 correctly decodes the transmitted signal, as any frequency offset could lead to decoding errors and reduced performance.

The UE 104 may synchronize its frequency with the network entity based on reference signals received from the network entity 102. For example, the network entity 102 may periodically transmit an SS (e.g., SSB and/or LP-SS). When the UE 104 receives the signal, it may estimate the frequency offset between its local oscillator (note, in some examples, the main radio and the LP-WUR may share an oscillator or use different oscillators, or the LP-WUR may not use an oscillator) and the network entity's oscillator, then adjust its local oscillator to correct any estimated offset.

Time synchronization is similar to frequency synchronization in that it is a process where the UE 104 aligns its internal clock with timing of the same reference signals received from the network entity. Such time synchronization processes are configured to ensure coherent communication between the UE 104 and network entity 102. Here, the UE 104 may receive an SSB and/or LP-SS and estimate a time offset between its internal clock and the network entity's timing. Once the time offset is estimated, the UE 104 adjusts its internal clock to correct this offset.

Examples of Time Synchronization and/or Frequency Synchronization During LP-WUS Communication FIG. 7 is a composite figure that includes a call-flow diagram illustrating example communications 700 between a UE 104 and a network entity or base station 102, and an example network 714 that includes the UE 104 and the base station. The base station 102 may provide communication coverage for a geographic coverage area 710.

At a first communication 701, the base station 102 may optionally transmit low-power (LP) configuration information to the UE 104. For example, the LP information may indicate time and/or frequency resources used by the base station 102 to transmit OOK-RS (e.g., LP-WUS and/or LP-SS) to the UE 104. In some examples, the first communication 701 may not be necessary if the UE 104 is configured with LP information previously by another base station or is pre-configured with the LP information during production. As described in the examples throughout the disclosure, the optional configuration information of the first communication may be transmitted via one or more of an RRC configuration message, downlink control information (DCI), and/or medium access control-control element (MAC-CE).

At a first process 702, the UE 104 may turn off its main radio or put the main radio into a low-power sleep mode. In some examples, the UE 104 may perform the first process 702 as part of a power-saving process and/or based on the UE 104 not expecting to receive downlink communications from the base station 102. It should be noted that the UE's LP-WUR may remain powered to receive signaling or detect instances of signals transmitted from the base station 102.

In some examples, the signals transmitted from the base station 102 may be a burst 708 of SSBs or OOK-RSs. For examples, the burst 708 may include multiple SSBs transmitted using an OFDM waveform with each SSB transmitted via a particular transmit beam. Similarly, the burst 708 may include multiple OOK-RSs transmitted using an OOK waveform, with each OOK-RS associated with a particular transmit beam. For example, the base station 102 may transmit n SSBs/LP-SSs via n directional beams. Thus, at a second communication 704, the base station 102 may transmit one or more reference signals. For example, the base station 102 may transmit a burst 708 of SSBs/LP-SSs, and the UE 104 may receive one or more of the SSBs/LP-SSs. For example, the base station 102 may transmit a first SSB/LP-SS (e.g., RS 2) via a first transmit beam 716, and the UE 104 may receive the first SSB via a first receive beam 712.

At a second process 706, the UE 104 may synchronize its timing with the timing of the base station 102 based on one or more SSB/LP-SS signals (including the first SSB/LP-SS) received or detected by the UE 104. In this example, because the UE's main radio is in a sleep mode or powered off, the UE 104 may be configured to monitor for one or more SSB/LP-SS signals using the LP-WUR. In some examples, the UE 104 may monitor for the SSB/LP-SS signal(s) using the same one or more receive beams that the UE 104 uses to receive PDCCH, PDSCH, and/or low-power wake-up signals (LP-WUSs) transmitted from the base station 102. It should be noted that because the base station 102 may transmit an LP-WUS using an OOK waveform, the UE 104 may receive the LP-WUS even if there is a frequency synchronization error between the UE 104 and the base station 102. However, if there is a time synchronization error between the two devices, the UE 104 may not be capable of receiving the LP-WUS.

Using the LP-WUR, the UE 104 may detect the one or more SSB signals by sensing a magnitude associated with the one or more SSB signals. Because the LP-WUR may be of limited functionality relative to the main radio, the UE 104 may not be expected to decode the SSB signals detected by the LP-WUR. However, the UE 104 may detect the magnitude of the SSB signals, and hence, the UE 104 may also determine a time that the SSB signals are detected by the LP-WUR. Thus, based on a time that the SSB signals are detected by the LP-WUR, the UE 104 may correct any time synchronization error between the UE 104 and the base station 102.

Alternatively, or in addition, the UE 104 may receive one or more OOK-RS signals using the LP-WUR. Here, the LP-WUR may receive and decode OOK-RS signals such as the LP-SS and LP-WUS. Based on a time that an OOK-RS signal is received by the LP-WUR, the UE 104 may correct any time synchronization error between the UE 104 and the base station 102.

At a third communication 718, the base station 102 may transmit an LP-WUS to the UE 104. The UE 104 may receive the LP-WUS via the first receive beam 712 and, in response, wake up its main radio for a future downlink communication. It should be noted that in the examples described herein, the base station 102 may transmit the LP-WUS to a single UE 104 or to a target UE group. At a third process 720, the UE 104 may power on the main radio or wake the main radio from a sleep mode in response to the LP-WUS. The LP-WUS may be configured to notify the UE 104 that the base station 102 will transmit PDCCH or PDSCH to the UE 104 in the future, for which the main radio will be required to receive and decode. It should be noted that the UE 104 may not expect to receive the PDCCH or PDSCH immediately after receiving the LP-WUS of the third communication 718. For example, the base station 102 may separate the LP-WUS transmission and the PDCCH/PDSCH transmission by a window of time to allow for the UE 104 to power on the main radio. Thus, there may be a time offset between transmission of the LP-WUS and the PDCCH/PDSCH.

Accordingly, as described above in reference to FIG. 7, the UE 104 may reduce its power consumption by powering off its main radio or putting the main radio into a sleep state. Moreover, the UE 104 may maintain time synchronization with the base station 102 without having to power on the main radio by using an LP-WUR to receive OOK-RSs and/or detect OFDM-waveform reference signals by the magnitude of the signals.

Figure 8:
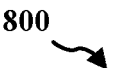
FIG. 8 is a call-flow diagram illustrating example communications between a UE and a network entity or base station.

FIG. 8 is a call-flow diagram illustrating example communications 800 between a UE 104 and a network entity or base station 102. Certain aspects of the communications 800 may be used for frequency synchronization between the UE 104 and the base station 102. Thus, in some examples, the communications 800 of FIG. 8 may be used in combination with the communications discussed above in connection with FIG. 7 to synchronize both time and frequency between the UE 104 and base station 102. However, it should be noted that in some examples, the communications 800 of FIG. 8 may provide both time and frequency synchronization between the UE 104 and base station 102

At a first communication 802, the base station 102 may optionally transmit synchronization configuration information to the UE 104. For example, the synchronization configuration information may provide the UE 104 with an indication that a reference signal (e.g., a tracking reference signal (TRS) or any other suitable reference signal shown in a third communication 810) will be transmitted after an LP-WUS to provide the UE 104 with a basis for frequency and/or time synchronization with the base station 102. The configuration information may include information associated with the reference signal, such as one or more of: the type of reference signal, the time and/or frequency resources via which the reference signal will be transmitted, the number of ports used for transmission, a scrambling ID, code division multiplexing type used for reference signal transmission (e.g., CDM), and any other suitable information. In some examples, the configuration information may indicate a duration of time between transmission of the LP-WUS at the second communication 806 and transmission of a reference signal at the third communication 810, as described in more detail below. The duration of time may be a maximum amount of time that the UE 104 may use to power-on or wake its main radio. The configuration information may also indicate that the UE 104 can expect the base station 102 to transmit the reference signal of the third communication 810 prior to the future downlink transmission indicated by the LP-WUS.

At a first process 804, the UE 104 may turn off its main radio or put the main radio into a low-power sleep mode. In some examples, the UE 104 may perform the first process 804 as part of a power-saving process and/or based on the UE 104 not expecting to receive downlink communications (e.g., PDCCH/PDSCH) from the base station 102. It should be noted that the UE's LP-WUR may remain powered to receive signaling or detect instances of signals transmitted from the base station 102.

At a second communication 806, the base station 102 may transmit an LP-WUS to the UE 104, wherein the LP-WUS is configured to notify the UE of a future downlink transmission. The UE 104 may receive the LP-WUS via its LP-WUR. In some examples, the LP-WUS is an OOK waveform. In some examples, the LP-WUS may include control bits configured to provide the UE 104 with an indication of the reference signal of the third communication 810 to be transmitted after the LP-WUS. For instance, the control bits may include the same information described above in reference to the configuration information of the first communication 802. In another example, the control bits may indicate an index value associated with a reference signal configuration. In this example, the configuration information of the first communication 802 may include a look-up table with multiple different reference signal configurations, each identified by an integer index value.

Receiving the LP-WUS may trigger the UE 104 to power-on or wake the main radio at a second process 808. It should be noted that transitioning the main radio from a sleep or power-off state to a functional awake or power-on state may not be instantaneous, but rather, may take some time. As discussed above, the UE 104 may be notified of the duration of time between transmission of the LP-WUS at the second communication 806 and transmission of the reference signal at the third communication 810 so that the UE 104 can start the state transition of the main radio in time to receive the reference signal at the third communication 810 via the main radio.

At a third communication 810, the base station may transmit a reference signal to the UE 104. The reference signal may be transmitted after a duration of time for the UE 104 to power-on or wake its main radio between the second communication 806 and the third communication 810. Here, the UE 104 may receive the reference signal via its main radio. At a third process 812, the UE 104 may perform one or more of a frequency synchronization and/or a time synchronization as described above with the base station 102 based on the received reference signal.

At a fourth communication 814, the base station 102 may transmit a downlink communication to the UE 104, and the UE 104 may receive the downlink communication via the main radio. In some examples, the downlink communication is indicated by the LP-WUS of the second communication 806.

Thus, in these examples, the UE 104 may keep its main radio in a low-power state until it receives a LP-WUS from the base station 102 via the UE's LP-WUR, thereby maximizing the amount of time that power is consumed by the main radio is reduced. Moreover, by separating the transmission of the LP-WUS of the second communication 806 and the reference signal of the third communication 810 into two separate communications, the UE 104 is provided with time to synchronize one or more of its timing and/or frequency with the base station 102 in order to ensure that the downlink transmission of the fourth communication 814 is properly received.

FIG. 9 is a composite figure that includes a call-flow diagram illustrating example communications 900 between a UE 104 and a network entity or base station 102, and an example timing diagram 950 illustrating aspects of the example communications 900.

At a first communication 902, the base station 102 may optionally transmit configuration information to the UE 104. The configuration information may indicate time and/or frequency resources used by the base station 102 to transmit OOK-RS (e.g., LP-WUS) to the UE 104. In some examples, the first communication 902 may not be necessary if the UE 104 is configured with the information previously by another base station or is pre-configured with the information during production.

At a first process 904, the UE 104 may turn off its main radio or put the main radio into a low-power sleep mode. In some examples, the UE 104 may perform the first process 904 as part of a power-saving process and/or based on the UE 104 not expecting to receive downlink communications (e.g., PDCCH/PDSCH) from the base station 102. It should be noted that the UE's LP-WUR may remain powered to receive signaling or detect instances of signals transmitted from the base station 102.

At a second communication 906, the base station 102 may transmit an LP-WUS to the UE 104, wherein the LP-WUS is an OOK waveform and is configured to notify the UE of a future downlink transmission. The UE 104 may receive the LP-WUS via its LP-WUR. In some examples, the LP-WUS may include control bits configured to notify the UE 104 to synchronize its timing and/or frequency with the base station 102 using a reference signal(s) transmitted by the base station 102 and received via the UE's main radio. In some examples, the LP-WUS may further be configured to notify the UE 104 to refrain from monitoring for a downlink signal (e.g., PDCCH) until after the UE 104 has synchronized its timing and/or frequency using the reference signal(s) received via the UE's main radio.

Receiving the LP-WUS may trigger the UE 104 to power-on or wake the main radio at a second process 908. It should be noted that transitioning the main radio from a sleep or power-off state to a functional awake or power-on state may not be instantaneous, but rather, may take some time. For example, as illustrated, the base station 102 may transmit a first SSB or SSB burst in a third transmission 910 after the UE 104 initiates powering on or waking the main radio but prior to the main radio being fully powered and/or functional. As such, the UE 104 may ignore the first SSB or SSB burst because the main radio may not be functional enough to receive such signaling (the main radio may still be transitioning from no power or sleep mode to powered and wake mode when the first SSB is transmitted).

At a first event 912, the main radio of the UE 104 may become functional and capable of receiving downlink signaling from the base station 102. Here, there may be a window of time 952 between a time when the main radio transitions 951 from a powered-off or sleep/low power mode to a functional, powered-on or wake mode, and another time when a second SSB is transmitted. During this window of time 952, the UE 104 may not expect to receive the downlink signaling indicated by the LP-WUS of the second communication 906. Instead, the UE 104 may monitor for a reference signal transmitted by the base station 102 prior to monitoring for PDSCH/PDCCH. As such, the UE 104 may refrain from monitoring for the PDSCH/PDCCH until after it receives the reference signaling.

At a fourth communication 914, the base station 102 may transmit a second SSB or SSB burst. At this point in time, the main radio of the UE 104 is functional enough to receive the second SSB or SSB burst. As such, the SSB is received, and the UE 104 may measure the SSB to estimate a time and/or frequency offset between the UE 104 and base station 102 to synchronize the timing and/or frequency of the UE 104 with that of the base station 102. Moreover, upon receiving the second SSB or SSB burst of the fourth communication 914, the UE 104 may, at a third process 916, begin monitoring for the PDSCH/PDCCH indicated by the LP-WUS of the second communication.

Thus, in these examples, the UE 104 may keep its main radio in a low-power state until it receives an LP-WUS from the base station 102 via the UE's LP-WUR, thereby maximizing the amount of time that power is consumed by the main radio is reduced. Moreover, because the UE 104 does not expect to receive the downlink signaling (PDSCH/PDCCH) indicated by the LP-WUS until after it receives a reference signal by which to synchronize one or more of a frequency and/or timing, coherent communication between the UE 104 and the base station 102 is improved.

Figure 10:
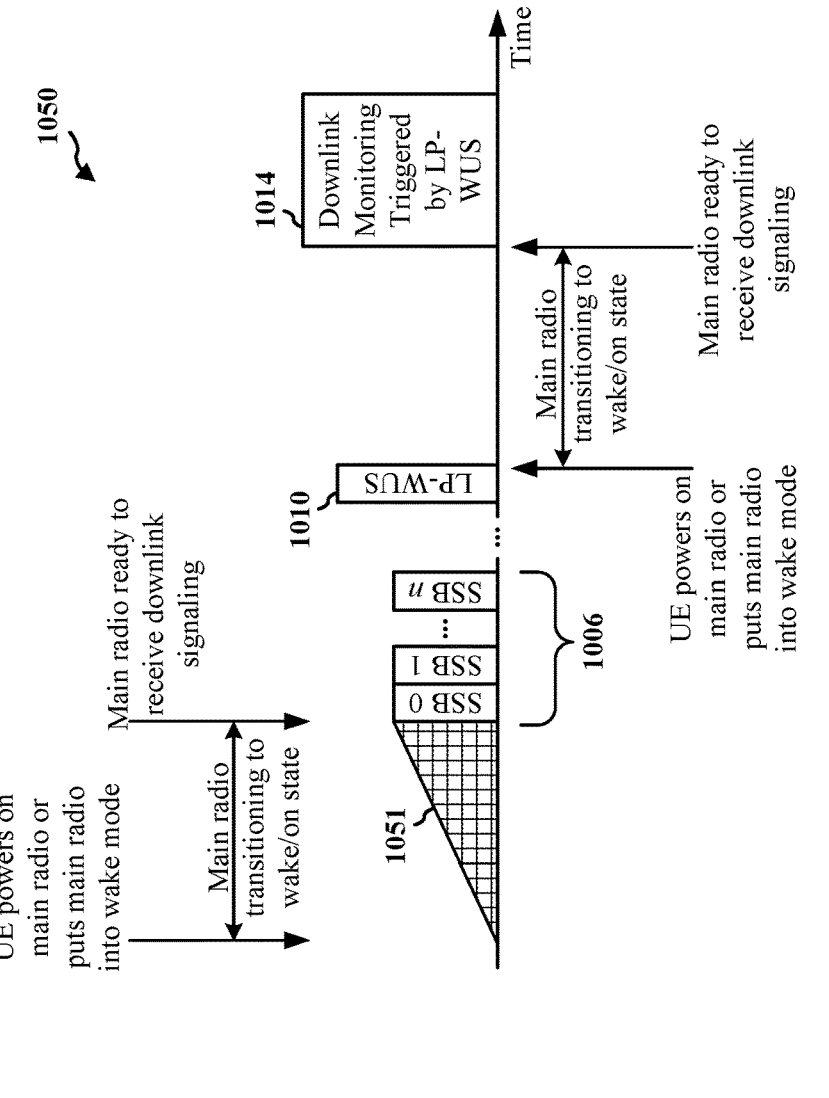
FIG. 10 is a composite figure that includes a call-flow diagram illustrating example communications between a UE and a network entity or base station, and an example timing diagram illustrating aspects of the example communications.

FIG. 10 is a composite figure that includes a call-flow diagram illustrating example communications 1000 between a UE 104 and a network entity or base station 102, and an example timing diagram 1050 illustrating aspects of the example communications 1000.

At a first communication 1002, the base station 102 may optionally transmit configuration information to the UE 104. The configuration information may indicate time and/or frequency resources used by the base station 102 to transmit OOK-RS (e.g., LP-WUS) to the UE 104. The configuration information may also indicate how often the UE 104 should turn on or wake its main radio to receive reference signals transmitted by the base station 102 for timing and/or frequency synchronization. The configuration information may also indicate a duration of time between transmission of the LP-WUS and transmission of a downlink communication indicated by the LP-WUS. This duration of time may be configured to provide the UE 104 with an indication of how long the UE 104 has to power on or wake its main radio. In some examples, the first communication 1002 may not be necessary if the UE 104 is configured with the information previously by another base station or is pre-configured with the information during production. In some examples, the UE 104 may determine how often to turn on or wake its main radio to receive reference signals for timing and/or frequency synchronization based on the magnitude of a frequency and/or timing offset between the UE 104 and the base station 102, or any other suitable metric.

At a first process 1004, the UE 104 may cycle power of its main radio on and off (or cycle from sleep mode to wake mode) periodically to match a periodicity of SSB and/or SSB burst transmissions from the base station 102. Here, the UE 104 may power on the main radio prior to an SSB transmission (e.g., second communication 1006) so that the main radio completes its transition 1051 from low-power or powered-off to wake or powered-on in time to receive the SSB when it is transmitted. The UE 104 may then power off or put the main radio into a sleep state until the next SSB. In some examples, the UE 104 may cycle the main radio power/mode once every 2 or more SSB transmissions. In this example, the UE 104 may cycle the main radio power/mode once every x number of SSB transmissions to save power.

At a second process 1008, the UE 104 may synchronize its timing and/or frequency with the base station 102 based on the received SSB (e.g., reference signal received at the second communication 1006). This way, the UE 104 may update/correct its timing and/or frequency periodically (e.g., at the same rate at which the base station 102 transmits SSBs, or at a less-frequent rate) so that UE 104 timing and frequency are synchronized with the base station 102 when an LP-WUS is received by the UE 104.

At a third communication 1010, the base station 102 may transmit an LP-WUS to the UE 104. The UE 104 may receive the LP-WUS via its LP-WUR. Here, if the main radio is already in a wake mode or powered on, the UE 104 may refrain from powering down or putting the main radio into sleep mode. Instead, the main radio may remain on and the UE 104 may begin monitoring for the downlink communication (e.g., PDCCH/PDSCH) indicated by the LP-WUS. If the base station 102 transmits an SSB prior to the downlink communication, then the UE 104 may use the main radio to receive the SSB, and then perform timing and/or frequency synchronization based on the received SSB prior to receiving the downlink communication.

At a third optional process 1012, if the UE 104 receives the LP-WUS while the main radio is off, then the UE 104 may power on or wake the main radio in response to receiving the LP-WUS. Once the main radio is ready to receive the downlink communication, the UE 104 may use it to monitor for the downlink communication at a fourth process 1014. Thus, in these examples, the UE 104 may continually use the main radio to synchronize one or more of a frequency and/or timing so that the UE 104 is ready to receive downlink communications.

FIG. 11 is a flowchart 1100 of a method of wireless communication. The method may be performed by a UE (e.g., the UE 104; the apparatus 1402). Specifically, the method may be performed by one or more processors, memories, and wireless communication circuitry (e.g., controller/processor 359, memory 360, antenna 352, Rx processor 356, Tx processor 368, etc.). The method may be performed using one or more additional aspects described in connection with FIGS. 12 and 13.

At 1102, the UE may optionally receive, from the network entity via the second radio, an indication of at least one of a time resource or a frequency resource for receiving the periodic reference signal. For example, 1102 may be performed by a receiving component 1440. Here, a network entity 102 may transmit an indication of time and/or frequency resources used by the network entity to transmit an OOK-RS to the UE 104.

At 1104, the UE may optionally receive, via the first radio and prior to the LP-WUS being received, a periodic reference signal. For example, 1102 may be performed by the receiving component 1440. Here, the UE 104 may synchronize timing of the main radio with the timing used by the network entity for transmissions based on the OOK RS (e.g., LP-SS or LP-WUS).

At 1106, the UE may optionally synchronize, prior to the LP-WUS being received, a timing of the second radio with a timing of a network entity based on the periodic reference signal. For example, 1106 may be performed by a synchronizing component 1442. Here, the network entity 102 may periodically transmit a reference signal (e.g., LP-SS) using an OOK waveform that the UE 104 may receive/detect and use to synchronizing its timing with the network entity 102.

At 1108, the UE may optionally receive, via the first radio and prior to the LP-WUS being received, a signal amplitude indicative of a synchronization signal block (SSB). For example, 1108 may be performed by the receiving component 1440. The UE 104 may use a low power wake up receiver (LP-WUR) to receive OOK waveform signals transmitted by the network entity 102. However, in some examples, the UE 104 may also use the LP-WUR to detect SSB transmissions. Here, the LP-WUR may detect a signal amplitude associated with the SSB transmission, and the UE 104 may use the signal amplitude to adjust its timing if necessary.

At 1110, the UE may optionally synchronize, prior to the LP-WUS being received, a timing of the UE with a timing of a network entity based on a time the signal amplitude was detected. For example, 1110 may be performed by the synchronizing component 1442. Here, the UE 104 may use the detection of the signal amplitude associated with an SSB transmission (or other OFDM reference signal) to adjust its timing.

At 1112, the UE may receive, via the first radio, a low-power wake-up signal (LP-WUS) indicating a downlink communication. For example, 1112 may be performed by the receiving component 1440. Here, the network entity 102 may transmit an LP-WUS signal via an OOK waveform. The LP-WUS may be an indication that the network entity 102 has downlink data to transmit to the UE 104. The UE 104 may receive the LP-WUS via the LP-WUR. In response to the LP-WUS, the UE 104 may power-on or wake its main radio (e.g., OFDM radio) in order to receive the downlink data via the main radio.

At 1116, the UE may optionally monitor, via the second radio, a downlink channel for the downlink communication after at least one of the dedicated reference signal or the periodic reference signal is received. For example, 1116 may be performed by a monitoring component 1446. Here, the UE 104 may not expect to receive a downlink communication from the network entity 102 until after it receives a reference signal from the network entity 102. Once the reference signal is received, the UE 104 may synchronize one or more of its timing and/or frequency with the network entity 102, then the UE 104 may begin to monitor, using the main radio, for a downlink communication from the network entity 102.

At 1118, the UE may receive the downlink communication via the second radio after the LP-WUS is received. For example, 1118 may be performed by the receiving component 1440. As discussed, the LP-WUS may be an OOK modulated signal received by the UE 104 via an LP-WUR. The LP-WUS may be used by the network entity to indicate that it has downlink data to transmit to the UE 104. In some examples, the UE 104 may power-on a main radio in response to the LP-WUS so that the UE 104 may receive the downlink data via the main radio.

In certain aspects, the main radio may include a radio capable of receiving and decoding OFDM signals, whereas the LP-WUR may be capable of receiving and decoding OOK modulated waveforms but not OFDM signals.

In certain aspects, the LP-WUS is an on-off keying (OOK) modulated waveform.

In certain aspects, the downlink communication is an OFDM modulated waveform.

In certain aspects, the main second radio is in a low-power state prior to the LP-WUS being received.

In certain aspects, the LP-WUS is received from the network entity, and wherein the LP-WUS is another reference signal characterized by an on-off keying (OOK) modulated waveform.

In certain aspects, the dedicated reference signal is a tracking reference signal (TRS), and wherein the LP-WUS comprises at least one of: (i) an indication of one or more communication parameters associated with the TRS, or (ii) an indication of a duration of time between receiving the LP-WUS and receiving the TRS.

In certain aspects, the periodic reference signal is a synchronization signal block (SSB) or a channel state information reference signal (CSI-RS), and wherein the LP-WUS comprises at least one of: (i) an indication of one or more communication parameters associated with the periodic reference signal, or (ii) an indication of a duration of time between receiving the LP-WUS and receiving the periodic reference signal.

In certain aspects, the dedicated reference signal or the periodic reference signal is received via a first receive beam, and wherein the LP-WUS is received via the first receive beam.

In certain aspects, the SSB is received via the first radio using a first beam, and wherein the LP-WUS is received via the first radio using the first beam.

Figure 12:
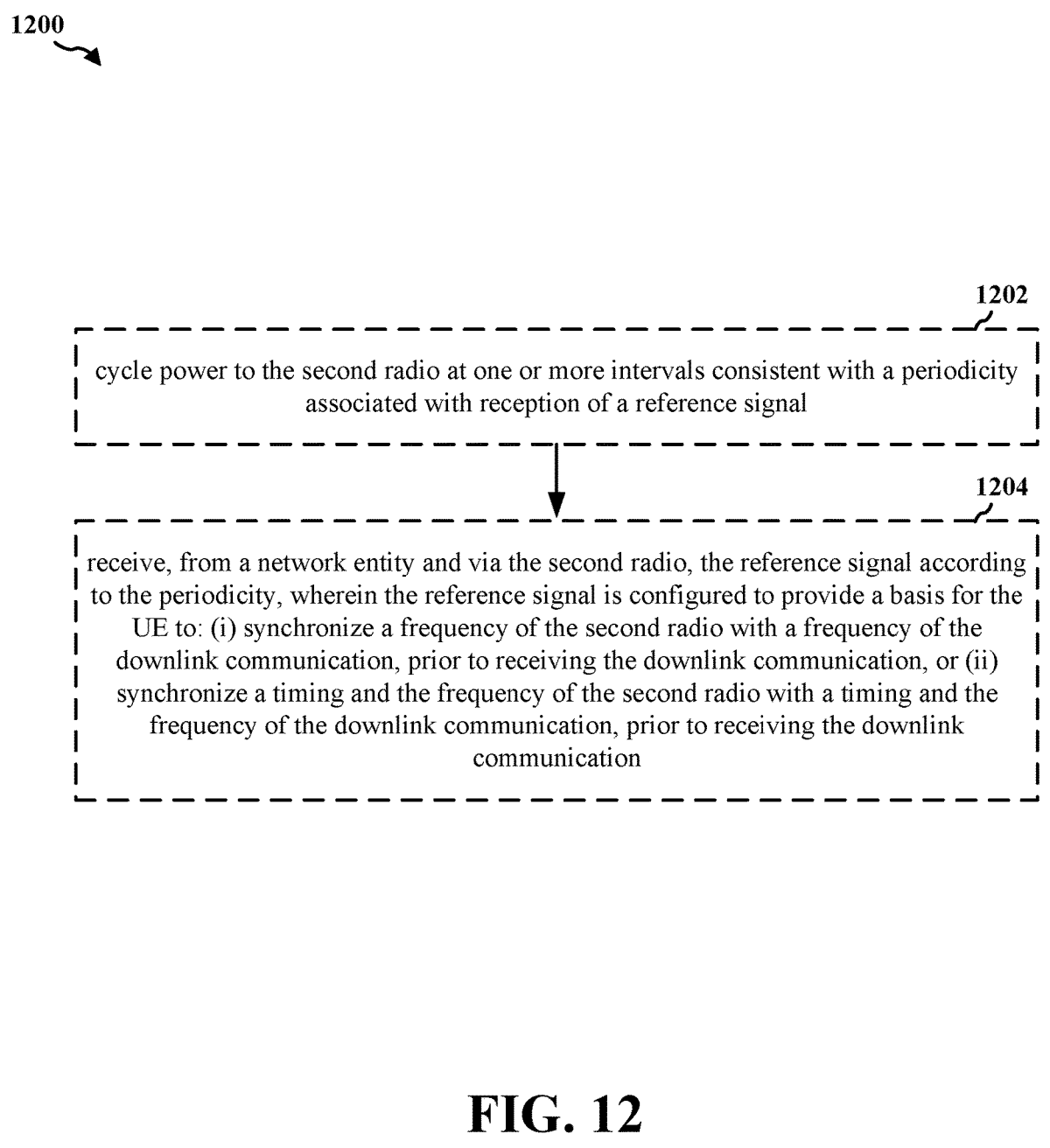

FIG. 12 is a flowchart 1200 of a method of wireless communication. The method may be performed by a UE (e.g., the UE 104; the apparatus 1402). Specifically, the method may be performed by one or more processors, memories, and wireless communication circuitry (e.g., controller/processor 359, memory 360, antenna 352, Rx processor 356, Tx processor 368, etc.). The method may be performed using one or more additional aspects described in connection with FIGS. 11 and 13.

At 1202, the UE may optionally cycle power to the second radio at one or more intervals consistent with a periodicity associated with reception of a reference signal. For example, 1202 may be performed by a cycling component 1444. Here, the UE 104 may cycle the power (on/off) and/or mode (sleep/wake) of the main radio so that the UE 104 can receive an OFDM reference signal (e.g., TRS, SSB, etc.) transmitted by the network entity via the main radio. Once the reference signal is received, the UE 104 may power-off or put the main radio back into a low power state. The UE 104 may then power the main radio back on to receive another reference signal in the future. The UE 104 may synchronize its timing and/or frequency with the network entity 102 based on the received OFDM reference signal.

At 1204, the UE may optionally receive, from a network entity and via the second radio, the reference signal according to the periodicity, wherein the reference signal is configured to provide a basis for the UE to: (i) synchronize a frequency of the second radio with a frequency of the downlink communication, prior to receiving the downlink communication, or (ii) synchronize a timing and the frequency of the second radio with a timing and the frequency of the downlink communication, prior to receiving the downlink communication. Here, the UE 104 may synchronize its main radio with the network entity 102 based on the periodic reference signals for which the main radio power is cycled to receive.

FIG. 13 is a flowchart 1300 of a method of wireless communication. The method may be performed by a UE (e.g., the UE 104; the apparatus 1402). Specifically, the method may be performed by one or more processors, memories, and wireless communication circuitry (e.g., controller/processor 359, memory 360, antenna 352, Rx processor 356, Tx processor 368, etc.). The method may be performed using one or more additional aspects described in connection with FIGS. 11 and 12.

At 1302, the UE may optionally power on the second radio or put the second radio into a wake state after receiving the LP-WUS. For example, 1302 may be performed by a powering component 1448. Here, the UE 104 may receive an OOK modulated signal via its LP-WUR, and in response, the UE 104 may power-on the main radio to receive a dedicated (e.g., TRS) or periodic (e.g., SSB) OFDM-modulated reference signal in the future.

At 1304, the UE may optionally receive, via the second radio prior to the downlink communication being received, at least one of a dedicated reference signal or a periodic reference signal, wherein the dedicated reference signal and the periodic reference signal are configured to provide a basis for the UE to: (i) synchronize a frequency of the second radio with a frequency of the downlink communication, prior to receiving the downlink communication, or (ii) synchronize a timing and the frequency of the second radio with a timing and the frequency of the downlink communication, prior to receiving the downlink communication. Here, the network entity 102 may transmit a dedicated reference signal to the UE 104 after transmitting the LP-WUS to the UE 104, so that the UE 104 can use the dedicated reference signal to synchronize one or more of its timing and/or its frequency with the network entity 102.

Figure 14:
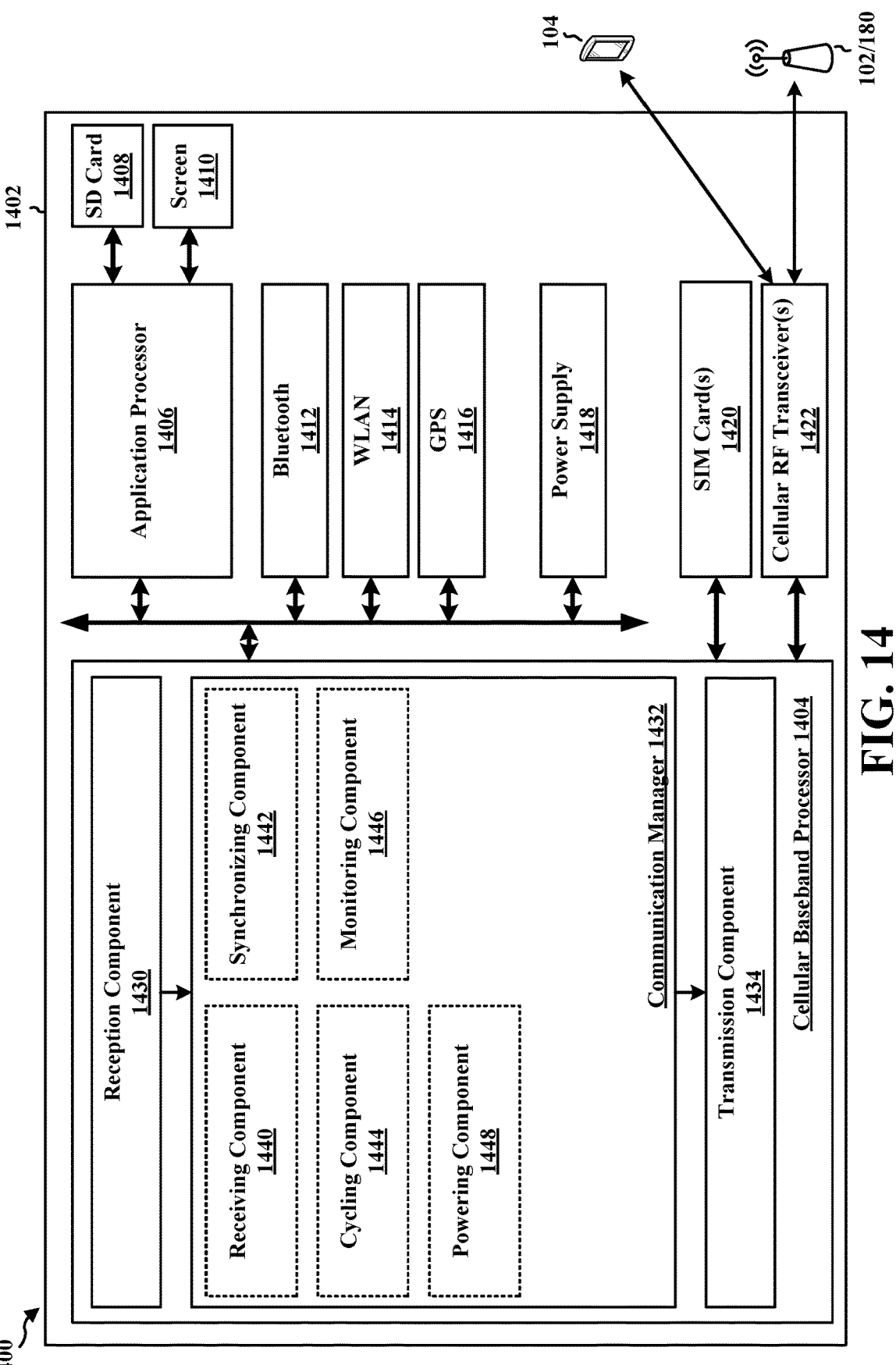
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to one or more cellular RF transceivers 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the one or more cellular RF transceivers 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 104 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see UE 104 of FIG. 3) and include the aforediscussed additional modules of the apparatus 1402. In various examples, the apparatus 1402 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 1432 includes a receiving component 1440 that is configured to: receive, from the network entity via the second radio, an indication of at least one of a time resource or a frequency resource for receiving the periodic reference signal; receive, via the first radio and prior to the LP-WUS being received, a periodic reference signal; receive, via the first radio and prior to the LP-WUS being received, a signal amplitude indicative of a synchronization signal block (SSB); receive, via the first radio, a low-power wake-up signal (LP-WUS) indicating a downlink communication; receive the downlink communication via the second radio after the LP-WUS is received; receive, from a network entity and via the second radio, the reference signal according to the periodicity, wherein the reference signal is configured to provide a basis for the UE to: (i) synchronize a frequency of the second radio with a frequency of the downlink communication, prior to receiving the downlink communication, or (ii) synchronize a timing and the frequency of the second radio with a timing and the frequency of the downlink communication, prior to receiving the downlink communication; and receive, via the second radio prior to the downlink communication being received, at least one of a dedicated reference signal or a periodic reference signal, wherein the dedicated reference signal and the periodic reference signal are configured to provide a basis for the UE to: (i) synchronize a frequency of the second radio with a frequency of the downlink communication, prior to receiving the downlink communication, or (ii) synchronize a timing and the frequency of the second radio with a timing and the frequency of the downlink communication, prior to receiving the downlink communication; e.g., as described in connection with 1102, 1104, 1108, 1112, 1118, 1204, and 1304 of FIGS. 11-13.

The communication manager 1432 further includes a synchronizing component 1442 configured to: synchronize, prior to the LP-WUS being received, a timing of the second radio with a timing of a network entity based on the periodic reference signal; and synchronize, prior to the LP-WUS being received, a timing of the UE with a timing of a network entity based on a time the signal amplitude was received; e.g., as described in connection with 1106 and 1110 of FIG. 11.

The communication manager 1432 further includes a cycling component 1444 configured to cycle power to the second radio at one or more intervals consistent with a periodicity associated with reception of a reference signal, e.g., as described in connection with 1202 of FIG. 12.

The communication manager 1432 further includes a monitoring component 1446 configured to monitor, via the second radio, a downlink channel for the downlink communication after at least one of the dedicated reference signal or the periodic reference signal is received, e.g., as described in connection with 1116 of FIG. 11.

The communication manager 1432 further includes a powering component 1448 configured to power on the second radio or put the second radio into a wake state after receiving the LP-WUS, e.g., as described in connection with 1302 of FIG. 13.

The apparatus may include additional components that perform each of the blocks of the algorithm in the aforementioned flowcharts of FIGS. 11-13. As such, each block in the aforementioned flowcharts may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes: means for receiving, from the network entity via the second radio, an indication of at least one of a time resource or a frequency resource for receiving the periodic reference signal; means for receiving, via the first radio and prior to the LP-WUS being received, a periodic reference signal; means for synchronizing, prior to the LP-WUS being received, a timing of the second radio with a timing of a network entity based on the periodic reference signal; means for receiving, via the first radio and prior to the LP-WUS being received, a signal amplitude indicative of a synchronization signal block (SSB); means for synchronizing, prior to the LP-WUS being received, a timing of the UE with a timing of a network entity based on a time the signal amplitude was received; means for receiving, via the first radio, a low-power wake-up signal (LP-WUS) indicating a downlink communication; means for monitoring, via the second radio, a downlink channel for the downlink communication after at least one of the dedicated reference signal or the periodic reference signal is received; means for receiving the downlink communication via the second radio after the LP-WUS is received; means for cycling power to the second radio at one or more intervals consistent with a periodicity associated with reception of a reference signal; means for receiving, from a network entity and via the second radio, the reference signal according to the periodicity, wherein the reference signal is configured to provide a basis for the UE to: (i) synchronize a frequency of the second radio with a frequency of the downlink communication, prior to receiving the downlink communication, or (ii) synchronize a timing and the frequency of the second radio with a timing and the frequency of the downlink communication, prior to receiving the downlink communication; means for powering on the second radio or put the second radio into a wake state after receiving the LP-WUS; and means for receiving, via the second radio prior to the downlink communication being received, at least one of a dedicated reference signal or a periodic reference signal, wherein the dedicated reference signal and the periodic reference signal are configured to provide a basis for the UE to: (i) synchronize a frequency of the second radio with a frequency of the downlink communication, prior to receiving the downlink communication, or (ii) synchronize a timing and the frequency of the second radio with a timing and the frequency of the downlink communication, prior to receiving the downlink communication.

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Means for receiving or means for obtaining may include a receiver such as the receive processor 356 and/or antenna(s) 352 of the UE 104 illustrated in FIG. 3. Means for transmitting or means for outputting may include a transmitter such as the transmit processor 368 or antenna(s) 352 of the UE 104 illustrated in FIG. 3. Means for synchronizing, means for cycling, means for monitoring, and means for powering may include: a processing system (which may include one or more processors, such as the controller/processor 359 and the memory 360), one or more aspects of the means for receiving and/or means for transmitting, and/or any other suitable hardware components of the UE 104 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

FIG. 15 is a flowchart 1500 of a method of wireless communication. The method may be performed by a network entity (e.g., the base station/network entity 102; the apparatus 1602). Specifically, the method may be performed by one or more processors, memories, and wireless communication circuitry (e.g., controller/processor 375, memory 376, antenna 320, Rx processor 370, Tx processor 316, etc.).

At 1502, the network entity 102 may optionally transmit an indication of at least one of a time resource or a frequency resource for receiving the LP-WUS. For example, 1502 may be performed by a transmitting component 1640. Here, a network entity 102 may transmit an indication of time and/or frequency resources used by the network entity 102 to transmit an OOK-RS to the UE 104.

At 1504, the network entity 102 may transmit a low-power wake-up signal (LP-WUS) indicating a downlink communication. For example, 1504 may be performed by the transmitting component 1640. Here, the network entity 102 may transmit an LP-WUS signal notifying the UE 104 that the network entity 102 has downlink data ready to be transmitted to it. The LP-WUS signal may be a low-power, OOK modulated signal.

At 1506, the network entity 102 may transmit the downlink communication after the LP-WUS is transmitted. For example, 1506 may be performed by the transmitting component 1640. Here, the network entity 102 may transmit a downlink communication to the UE 104 after transmitting the LP-WUS.

In certain aspects, at least one of: the LP-WUS is an on-off keying (OOK) modulated waveform; or the LP-WUS is transmitted as part of a periodic LP-WUS transmission.

In certain aspects, the downlink communication is an OFDM modulated waveform.

Figure 16:
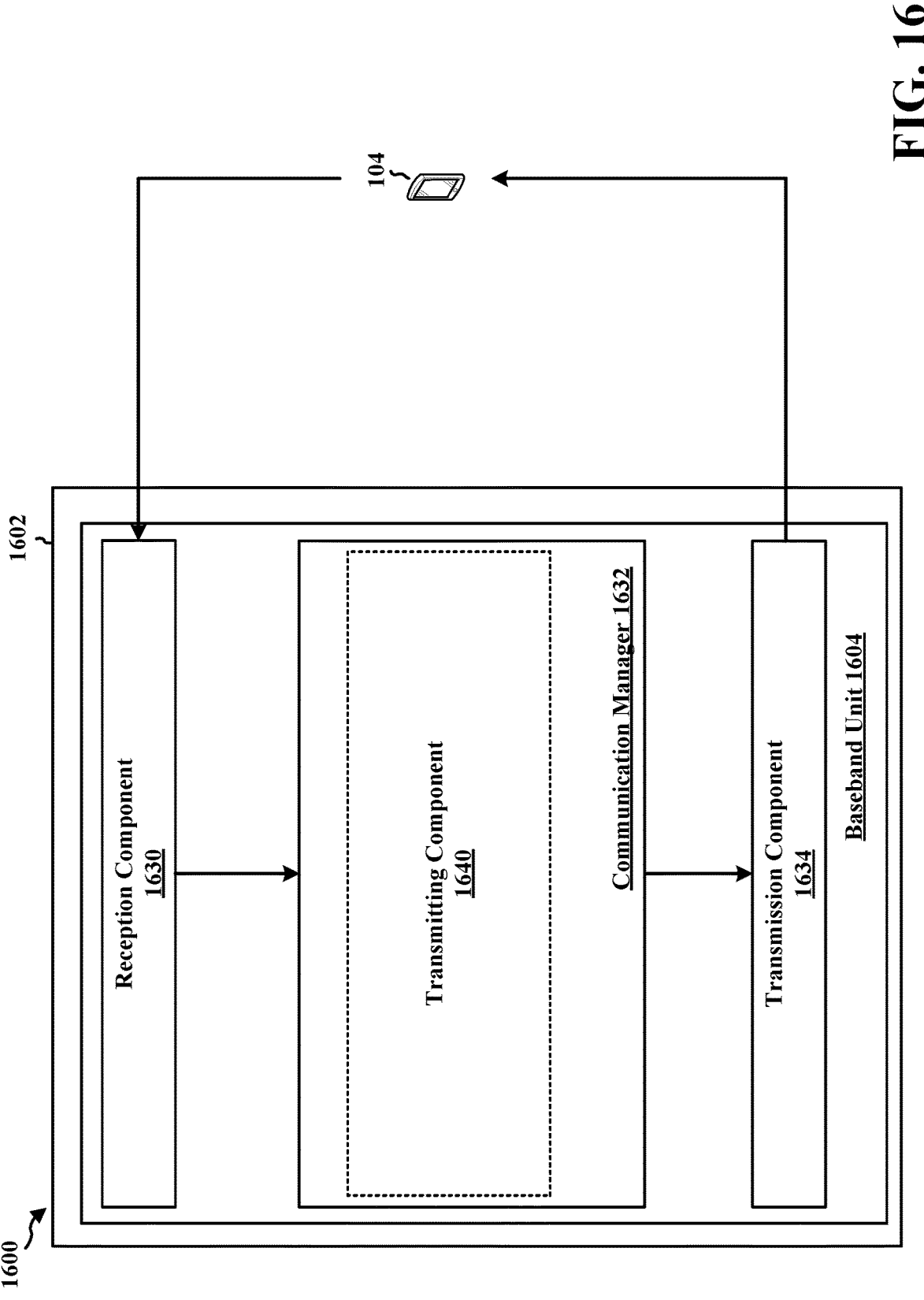
FIG. 16 is a diagram illustrating another example of a hardware implementation for another example apparatus.

FIG. 16 is a diagram 1600 illustrating an example of a hardware implementation for an apparatus 1602. The apparatus 1602 is a network entity/base station and includes a baseband unit 1604. The baseband unit 1604 may communicate through one or more cellular RF transceivers with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 102/180 and may include the memory 376 and/or at least one of the TX processor 316, the RX processor 370, and the controller/processor 375. In various examples, the apparatus 1602 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 1632 includes a transmitting component 1640 configured to: transmit an indication of at least one of a time resource or a frequency resource for receiving the LP-WUS; transmit a low-power wake-up signal (LP-WUS) indicating a downlink communication; and transmit the downlink communication after the LP-WUS is transmitted; e.g., as described in connection with 1502, 1504, and 1506 of FIG. 15.

The apparatus may include additional components that perform each of the blocks of the algorithm in the aforementioned flowchart of FIG. 15. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes: means for transmitting an indication of at least one of a time resource or a frequency resource for receiving the LP-WUS; means for transmitting a low-power wake-up signal (LP-WUS) indicating a downlink communication; and means for transmitting the downlink communication after the LP-WUS is transmitted. The aforementioned means may be one or more of the aforementioned components of the apparatus 1602 configured to perform the functions recited by the aforementioned means. As described supra, the apparatus 1602 may include the Tx processor 316, the Rx processor 370, and the controller/processor 375. As such, in one configuration, the aforementioned means may be the Tx processor 316, the Rx processor 370, and the controller/processor 375 configured to perform the functions recited by the aforementioned means. In one example, the means for transmitting, or means for outputting, may include the Tx processor 316 and the controller/processor 375.

Additional Considerations

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the terms "cycling" and/or "powering" may encompass a wide variety of actions associated with adjusting or controlling a mode of operation or a powered state of one or more hardware components. For example, "cycling" and/or "powering" may include turning power from on to off, and back to on, or changing an operating state from a sleep mode to an awake mode.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method for wireless communication at a wireless node, comprising: obtaining, via a first radio, a low-power wake-up signal (LP-WUS) indicating a downlink communication; and obtaining the downlink communication via a second radio after the LP-WUS is obtained.

Example 2 is the method of Example 1, wherein the LP-WUS is an on-off keying (OOK) modulated waveform.

Example 3 is the method of any of Examples 1 and 2, wherein the downlink communication is an OFDM modulated waveform.

Example 4 is the method of any of Examples 1-3, wherein the second radio is in a low-power state prior to the LP-WUS being obtained, and wherein the method further comprises: obtaining, via the first radio and prior to the LP-WUS being obtained, a periodic reference signal; and synchronizing, prior to the LP-WUS being obtained, a timing of the second radio with a timing of a network entity based on the periodic reference signal.

Example 5 is the method of Example 4, wherein the LP-WUS is obtained from the network entity, and wherein the LP-WUS is another reference signal characterized by an on-off keying (OOK) modulated waveform.

Example 6 is the method of any of Examples 4 and 5, wherein the method further comprises: obtaining, from the network entity via the second radio, an indication of at least one of a time resource or a frequency resource for obtaining the periodic reference signal.

Example 7 is the method of any of Examples 1-6, wherein the second radio is in a low-power state prior to the LP-WUS being obtained, and wherein the method further comprises: powering on the second radio or putting the second radio into a wake state after obtaining the LP-WUS; and obtaining, via the second radio prior to the downlink communication being obtained, at least one of a dedicated reference signal or a periodic reference signal, wherein the dedicated reference signal and the periodic reference signal are configured to provide a basis for the wireless node to: (i) synchronize a frequency of the second radio with a frequency of the downlink communication, prior to obtaining the downlink communication, or (ii) synchronize a timing and the frequency of the second radio with a timing and the frequency of the downlink communication, prior to obtaining the downlink communication.

Example 8 is the method of Example 7, wherein the dedicated reference signal is a tracking reference signal (TRS), and wherein the LP-WUS comprises at least one of: (i) an indication of one or more communication parameters associated with the TRS, or (ii) an indication of a duration of time between obtaining the LP-WUS and obtaining the TRS.

Example 9 is the method of any of Examples 7 and 8, wherein the periodic reference signal is a synchronization signal block (SSB) or a channel state information reference signal (CSI-RS), and wherein the LP-WUS comprises at least one of: (i) an indication of one or more communication parameters associated with the periodic reference signal, or (ii) an indication of a duration of time between obtaining the LP-WUS and obtaining the periodic reference signal.

Example 10 is the method of any of Examples 7-9, wherein the dedicated reference signal or the periodic reference signal is obtained via a first receive beam, and wherein the LP-WUS is obtained via the first receive beam.

Example 11 is the method of any of Examples 7-10, wherein the method further comprises: monitoring, via the second radio, a downlink channel for the downlink communication after at least one of the dedicated reference signal or the periodic reference signal is obtained.

Example 12 is the method of any of Examples 1-11, wherein the method further comprises: cycling power to the second radio at one or more intervals consistent with a periodicity associated with reception of a reference signal.

Example 13 is the method of Example 12, wherein the method further comprises: obtaining, from a network entity and via the second radio, the reference signal according to the periodicity, wherein the reference signal is configured to provide a basis for the wireless node to: (i) synchronize a frequency of the second radio with a frequency of the downlink communication, prior to obtaining the downlink communication, or (ii) synchronize a timing and the frequency of the second radio with a timing and the frequency of the downlink communication, prior to obtaining the downlink communication.

Example 14 is the method of any of Examples 1-13, wherein the second radio is in a low-power state prior to the LP-WUS being obtained, and wherein the method further comprises: obtaining, via the first radio and prior to the LP-WUS being obtained, a signal amplitude indicative of a synchronization signal block (SSB); and synchronizing, prior to the LP-WUS being obtained, a timing of the wireless node with a timing of a network entity based on a time the signal amplitude was obtained.

Example 15 is the method of Example 14, wherein the SSB is obtained via the first radio using a first beam, and wherein the LP-WUS is obtained via the first radio using the first beam.

Example 16 is a method for wireless communication at a wireless node, comprising:

outputting a low-power wake-up signal (LP-WUS) for transmission, the LP-WUS indicating a downlink communication; and outputting the downlink communication for transmission after the LP-WUS is transmitted.

Example 17 is the method of Example 16, wherein at least one of: the LP-WUS is an on-off keying (OOK) modulated waveform; or the LP-WUS is output for transmission as part of a periodic LP-WUS transmission.

Example 18 is the method of any of Examples 16 and 17, wherein the downlink communication is an OFDM modulated waveform.

Example 19 is the method of Example 18, wherein the method further comprises: outputting for transmission an indication of at least one of a time resource or a frequency resource for obtaining the LP-WUS.

Example 20 is an apparatus for wireless communications, comprising means for performing a method in accordance with any one of examples 1-15.

Example 21 is an apparatus for wireless communications, comprising means for performing a method in accordance with any one of examples 16-19.

Example 22 is a non-transitory computer-readable medium comprising instructions that, when executed by a wireless node, cause the wireless node to perform a method in accordance with any one of examples 1-15.

Example 23 is a non-transitory computer-readable medium comprising instructions that, when executed by a wireless node, cause the wireless node to perform a method in accordance with any one of examples 16-19.

Example 24 is a wireless node for wireless communications, comprising: a first radio; a second radio, an operation of which consumes more power than the first radio; one or more memories, individually or in combination, having instructions; and one or more processors, individually or in combination, configured to execute the instructions and cause the apparatus to perform a method in accordance with any one of examples 1-15.

Example 25 is an apparatus for wireless communications, comprising: one or more memories, individually or in combination, having instructions; and one or more processors, individually or in combination, configured to execute the instructions and cause the apparatus to perform a method in accordance with any one of examples 16-19.

Example 26 is a wireless node, comprising: a first radio; a second radio, an operation of which consumes more power than the first radio; one or more memories, individually or in combination, having instructions; and one or more processors, individually or in combination, configured to execute the instructions and cause the wireless node to perform a method in accordance with any one of examples 1-16, wherein the first radio is configured to receive the LP-WUS indicating the downlink communication, and wherein the second radio is configured to receive the downlink communication after the LP-WUS is received.

Example 27 is a wireless node, comprising: one or more transceivers; one or more memories, individually or in combination, having instructions; and one or more processors, individually or in combination, configured to execute the instructions and cause the wireless node to perform a method in accordance with any one of examples 16-19, wherein the one or more transceivers, individually or in combination, are configured to: transmit the LP-WUS, and transmit the downlink communication after the LP-WUS is transmitted.

What is claimed is:

1. A user equipment (UE) for wireless communication, comprising:

a first radio;

a second radio, an operation of which consumes more power than the first radio;

one or more memories, individually or in combination, having instructions; and one or more processors, individually or in combination, configured to execute the instructions and cause the UE to:

receive, via the first radio, a low-power wake-up signal (LP-WUS) indicating a downlink communication; and receive the downlink communication via the second radio after the LP-WUS is received, wherein the second radio is in a low-power state prior to the LP-WUS being received, and wherein the one or more processors, individually or in combination, are further configured to cause the UE to:

receive, via the first radio and prior to the LP-WUS being received, a periodic reference signal; and synchronize, prior to the LP-WUS being received, a timing of the second radio with a timing of a network entity based on the periodic reference signal.

2. The UE of claim 1, wherein the LP-WUS is an on-off keying (OOK) modulated waveform.

3. The UE of claim 1, wherein the downlink communication is an OFDM modulated waveform.

4. The UE of claim 1, wherein the LP-WUS is received from the network entity, and wherein the LP-WUS is another reference signal characterized by an on-off keying (OOK) modulated waveform.

5. The UE of claim 1, wherein the one or more processors, individually or in combination, are further configured to cause the UE to:

receive, from the network entity via the second radio, an indication of at least one of a time resource or a frequency resource for receiving the periodic reference signal.

6. The UE of claim 1, wherein the second radio is in the low-power state prior to the LP-WUS being received, and wherein the one or more processors, individually or in combination, are further configured to cause the UE to:

power on the second radio or put the second radio into a wake state after receiving the LP-WUS; and receive, via the second radio prior to the downlink communication being received, at least one of a dedicated reference signal or the periodic reference signal, wherein the dedicated reference signal and the periodic reference signal are configured to provide a basis for the UE to:

(i) synchronize a frequency of the second radio with a frequency of the downlink communication, prior to receiving the downlink communication, or (ii) synchronize the timing and the frequency of the second radio with a timing and the frequency of the downlink communication, prior to receiving the downlink communication.

7. The UE of claim 6, wherein the dedicated reference signal is a tracking reference signal (TRS), and wherein the LP-WUS comprises at least one of:

(i) an indication of one or more communication parameters associated with the TRS, or (ii) an indication of a duration of time between receiving the LP-WUS and receiving the TRS.

8. The UE of claim 6, wherein the periodic reference signal is a synchronization signal block (SSB) or a channel state information reference signal (CSI-RS), and wherein the LP-WUS comprises at least one of:

(i) an indication of one or more communication parameters associated with the periodic reference signal, or (ii) an indication of a duration of time between receiving the LP-WUS and receiving the periodic reference signal.

9. The UE of claim 6, wherein the dedicated reference signal or the periodic reference signal is received via a first receive beam, and wherein the LP-WUS is received via the first receive beam.

10. The UE of claim 6, wherein the one or more processors, individually or in combination, are further configured to cause the UE to:

monitor, via the second radio, a downlink channel for the downlink communication after at least one of the dedicated reference signal or the periodic reference signal is received.

11. The UE of claim 1, wherein the one or more processors, individually or in combination, are further configured to cause the UE to:

cycle power to the second radio at one or more intervals consistent with a periodicity associated with reception of a reference signal.

12. The UE of claim 11, wherein the one or more processor, individually or in combination, are further configured to cause the UE to:

receive, from the network entity and via the second radio, the reference signal according to the periodicity, wherein the reference signal is configured to provide a basis for the UE to:

(i) synchronize a frequency of the second radio with a frequency of the downlink communication, prior to receiving the downlink communication, or (ii) synchronize the timing and the frequency of the second radio with a timing and the frequency of the downlink communication, prior to receiving the downlink communication.

13. The UE of claim 1, wherein the second radio is in the low-power state prior to the LP-WUS being received, and wherein the one or more processors, individually or in combination, are further configured to cause the UE to:

receive, via the first radio and prior to the LP-WUS being received, a signal amplitude indicative of a synchronization signal block (SSB); and synchronize, prior to the LP-WUS being received, a timing of the UE with the timing of the network entity based on a time the signal amplitude was received.

14. The UE of claim 13, wherein the SSB is received via the first radio using a first beam, and wherein the LP-WUS is received via the first radio using the first beam.

15. An apparatus for wireless communication, comprising:

one or more memories, individually or in combination, having instructions; and one or more processors, individually or in combination, configured to execute the instructions and cause the apparatus to:

output a low-power wake-up signal (LP-WUS) for transmission, the LP-WUS indicating a downlink communication; and output the downlink communication for transmission after the LP-WUS is outputted, wherein the one or more processors, individually or in combination, are further configured to cause the apparatus to:

output, prior to the LP-WUS being outputted, a periodic reference signal for transmission, wherein the periodic reference signal is configured to provide a basis for a user equipment (UE) to synchronize a timing of a radio of the UE with a timing of the apparatus.

16. The apparatus of claim 15, wherein at least one of:

the downlink communication is an OFDM modulated waveform;

the LP-WUS is an on-off keying (OOK) modulated waveform; or the LP-WUS is transmitted as part of a periodic LP-WUS transmission.

17. The apparatus of claim 16, wherein the one or more processors, individually or in combination, are further configured to cause the apparatus to:

output for transmission an indication of at least one of a time resource or a frequency resource for receiving the LP-WUS.

18. The apparatus of claim 15, further comprising one or more transceivers, individually or in combination, configured to:

transmit the LP-WUS; and transmit the downlink communication, wherein the apparatus is configured as a network entity.

19. A method for wireless communications at a wireless node, comprising:

obtaining, via a first radio, a low-power wake-up signal (LP-WUS) indicating a downlink communication; and obtaining the downlink communication via a second radio after the LP-WUS is received, wherein the second radio is in a low-power state prior to the LP-WUS being obtained, and wherein the method further comprises:

obtaining, via the first radio and prior to the LP-WUS being obtained, a periodic reference signal; and synchronizing, prior to the LP-WUS being obtained, a timing of the second radio with a timing of a network entity based on the periodic reference signal.

* * * * *